US012618449B2

(12) United States Patent
Steeb et al.

(10) Patent No.: US 12,618,449 B2
(45) Date of Patent: May 5, 2026

(54) SHOCK ABSORBER

(71) Applicant: Hitachi Astemo, Ltd., Ibaraki (JP)

(72) Inventors: Markus Steeb, Plymouth, MI (US);
Shivanand Sankaran, Canton, MI
(US); Andrew Feldkamp, Dexter, MI
(US)

(73) Assignee: HITACHI ASTEMO, LTD., Ibaraki
(JP)

( * ) Notice: Subject to any disclaimer, the term of this
patent is extended or adjusted under 35
U.S.C. 154(b) by 400 days.

(21) Appl. No.: 18/139,969

(22) Filed: Apr. 27, 2023

(65) Prior Publication Data

US 2024/0360885 A1    Oct. 31, 2024

(51) Int. Cl.
*F16F 9/348* (2006.01)
*F16F 9/18* (2006.01)
(52) U.S. Cl.
CPC .......... *F16F 9/3484* (2013.01); *F16F 9/3485*
(2013.01); *F16F 9/185* (2013.01)
(58) Field of Classification Search
CPC .......... F16F 9/348–3488; F16F 9/3242; F16F
9/185; B60G 2206/41; B60G 13/08;
B60G 17/08
See application file for complete search history.

(56) References Cited

U.S. PATENT DOCUMENTS 4,401,196 A * 8/1983 Grundei ................ F16F 9/3484
137/513.3
4,782,925 A * 11/1988 Grundei .................. F16F 9/585
188/315

8,297,418 B2    10/2012  Bombrys et al.
2009/0301831 A1* 12/2009  Bombrys ............... B60G 13/08
188/322.15
2021/0088098 A1    3/2021  Cendoya

FOREIGN PATENT DOCUMENTS

JP        07-22147 U    4/1995

OTHER PUBLICATIONS

International Search Report received in corresponding International
Application No. PCT/JP2024/010649 dated Apr. 23, 2024.
Written Opinion of the International Searching Authority received
in corresponding International Application No. PCT/JP2024/
010649 dated Apr. 23, 2024.

* cited by examiner

*Primary Examiner* — David R Morris
(74) *Attorney, Agent, or Firm* — MATTINGLY &
MALUR, PC

(57) ABSTRACT

This shock absorber includes a cylinder having an inner
chamber; a cage body partitioning the inner chamber into
first and second chambers, and includes a first passage
allowing communication between the first and second cham-
bers, a first seat part, a second passage allowing communi-
cation between the first and second chambers, and a second
seat part. A first valve which is a first valve coming into
contact with the first seat part to close the first passage and
being separated from the first seat part to open the first
passage, and in which a communication hole communicat-
ing with the second passage is formed. A second valve
comes into contact with the second seat part to close the
second passage and is separated from the second seat part to
open the second passage. A passage adjusting disc is pro-
vided between the first valve and the cage body.

3 Claims, 19 Drawing Sheets

SHOCK ABSORBER

BACKGROUND OF THE INVENTION

Field of the Invention

The present invention relates to a shock absorber.

Description of Related Art

There are shock absorbers including a valve assembly having valve discs on both sides of a valve body (see, for example, the specification of U.S. Pat. No. 8,297,418).

Incidentally, there has been a demand to suppress an increase in cost in shock absorbers.

Accordingly, an objective of the present invention is to provide a shock absorber in which an increase in cost can be suppressed.

SUMMARY OF THE INVENTION

In order to achieve the above-described objective, one aspect of a shock absorber of the present invention includes a cylinder having an inner chamber inside, a cage body partitioning the inner chamber into a first chamber and a second chamber, and including a first passage allowing communication between the first chamber and the second chamber, a first seat part provided to surround an end portion of the first passage on the first chamber side, a second passage allowing communication between the first chamber and the second chamber, and a second seat part provided to surround an end portion of the second passage on the second chamber side, a first valve coming into contact with the first seat part to close the first passage and being separated from the first seat part to open the first passage, and in which a communication hole communicating with the second passage is formed, a second valve coming into contact with the second seat part to close the second passage and being separated from the second seat part to open the second passage, and a passage adjusting disc provided between the first valve and the cage body to reduce the second passage.

According to the above-described aspect of the present invention, it is possible to suppress an increase in cost.

DETAILED DESCRIPTION OF THE INVENTION

First Embodiment

A first embodiment will be described below with reference to FIGS. 1 to 9.

Figure 1:
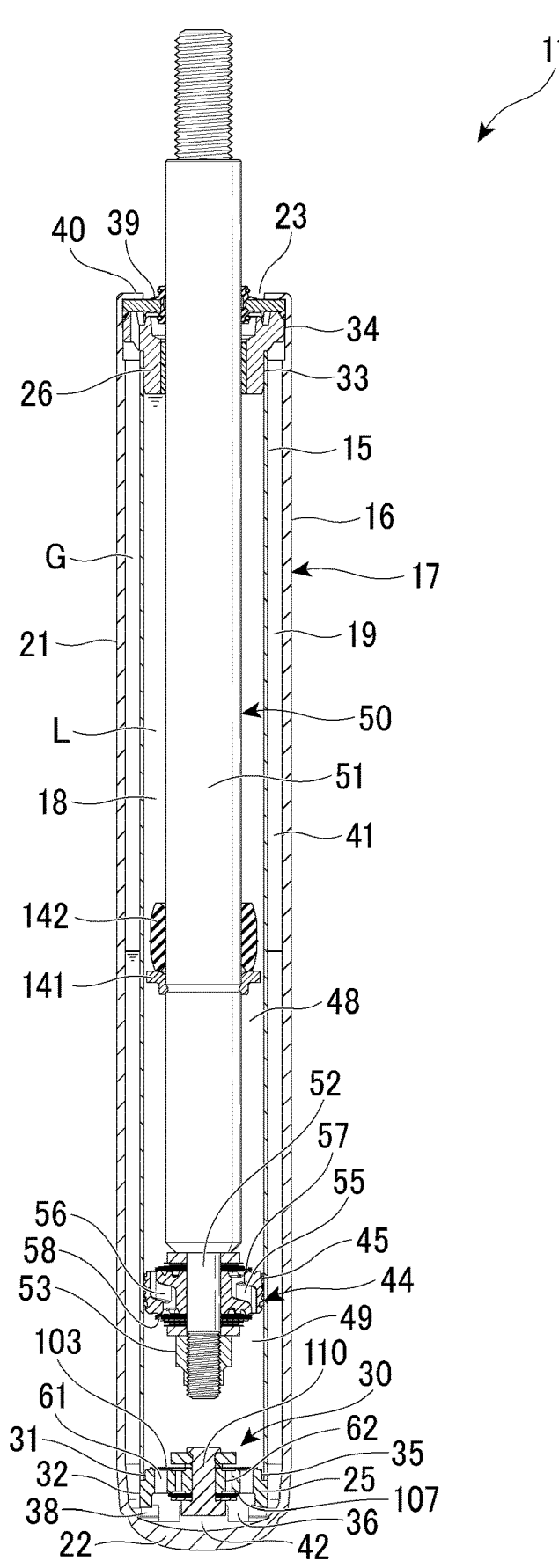
FIG. 1 is a cross-sectional view showing a shock absorber of a first embodiment according to the present invention.

FIG. 1 shows a shock absorber 11 of the first embodiment. The shock absorber 11 is a shock absorber used in a suspension device of a vehicle such as an automobile or a railway vehicle. The shock absorber 11 is specifically a shock absorber used for a strut-type suspension of an automobile. The shock absorber 11 includes a cylinder 17 having a tube 15 and a shell 16. The cylinder 17 includes an inner chamber 18 inside.

The tube 15 has a cylindrical shape. The shell 16 has a bottomed cylindrical shape. The shell 16 has a larger diameter than the tube 15 and is provided on an outer circumferential side of the tube 15. Therefore, the shock absorber 11 is a dual-tube type shock absorber. A space between the shell 16 and the tube 15 serves as a reservoir chamber 19 which is part of the inner chamber 18.

The shell 16 is an integrally formed product formed of one metal member. The shell 16 has a side wall part 21 and a bottom part 22. The side wall part 21 has a cylindrical shape. The bottom part 22 has a disc shape and closes one end portion side of the side wall part 21 in an axial direction. The shell 16 has an opening 23 on a side of the side wall part 21 opposite to the bottom part 22.

The shock absorber 11 includes a cage body 25 and a rod guide 26. The cage body 25 has an annular shape, is provided at one end portion of the tube 15 in the axial direction, and is placed on the bottom part 22 of the shell 16. The rod guide 26 has an annular shape, and is provided at an end portion on a side opposite to the cage body 25 in the axial direction of the tube 15 and the shell 16.

The cage body 25 is one constituting a body valve assembly 30. The cage body 25 includes a small outer diameter part 31 and a large outer diameter part 32 having a larger diameter than the small outer diameter part 31 on an outer circumferential portion. The cage body 25 is in contact with the bottom part 22 in a state in which it is positioned in a radial direction with respect to the shell 16.

The rod guide 26 includes a small outer diameter part 33 and a large outer diameter part 34 having a larger diameter than the small outer diameter part 33 on an outer circumferential portion. The rod guide 26 is fitted to the side wall part 21 of the shell 16 at the large outer diameter part 34. Therefore, the rod guide 26 is positioned in the radial direction with respect to the shell 16.

One end portion of the tube 15 in the axial direction is fitted to the small outer diameter part 31 of the cage body 25. The other end portion of the tube 15 in the axial direction is fitted to the small outer diameter part 33 of the rod guide 26. Thereby, the tube 15 is positioned in the radial direction with respect to the shell 16.

The cage body 25 includes a partition part 35 and a leg part 36.

The partition part 35 has a bored disc shape. A portion of the large outer diameter part 32 on the small outer diameter part 31 side in the axial direction and the small outer diameter part 31 are formed in the partition part 35.

The leg part 36 protrudes in the axial direction of the partition part 35 from an outer circumferential side of the partition part 35. The leg 36 has an annular shape. A portion of the large outer diameter part 32 on a side opposite to the small outer diameter part 31 in the axial direction is formed in the leg part 36. A passage groove 38 is formed at a portion of the leg part 36 on a side opposite to the partition part 35 in the axial direction. The passage groove 38 penetrates the leg part 36 in a radial direction of the leg part 36. A plurality of passage grooves 38 having the same shape are provided in the leg part 36 at regular intervals in a circumferential direction.

The cage body 25 is in contact with the bottom part 22 of the shell 16 at the leg part 36. A space between the bottom part 22 of the shell 16 and the cage body 25 communicates with a space between the side wall part 21 of the shell 16 and the tube 15 via the passage grooves 38. Thereby, the space between the cage body 25 and the bottom part 22 constitutes the reservoir chamber 19 similarly to the space between the tube 15 and the shell 16. The reservoir chamber 19 includes a tubular chamber 41 having a tubular shape between the side wall part 21 of the shell 16 and the tube 15, and a bottom chamber 42 (second chamber) between the cage body 25 and the bottom part 22.

The shock absorber 11 includes a seal member 39. The seal member 39 has an annular shape and is provided on a side of the rod guide 26 opposite to the bottom part 22. The seal member 39 is fitted to an inner circumferential portion of the side wall part 21 of the shell 16. A locking part 40 is formed at an end portion on a side opposite to the bottom part 22 in the axial direction of the side wall part 21. The locking part 40 is formed by plastically deforming the cylindrical side wall part 21 inward in the radial direction by swaging processing such as curling processing. The seal member 39 is sandwiched between the locking part 40 and the rod guide 26. The seal member 39 closes the opening 23 of the shell 16, and is specifically an oil seal.

The shock absorber 11 includes a piston assembly 44. The piston assembly 44 is disposed inside the tube 15 of the cylinder 17. The piston assembly 44 includes a piston 45. The piston 45 of the piston assembly 44 is slidably fitted in the tube 15. The piston 45 partitions the inside of the tube 15 into two chambers including an upper chamber 48 and a lower chamber 49 (first chamber). The upper chamber 48 and the lower chamber 49, together with the reservoir chamber 19, constitute the inner chamber 18 in the cylinder 17. The upper chamber 48 is provided between the piston 45 and the rod guide 26 inside the tube 15. The lower chamber 49 is provided between the piston 45 and the cage body 25 inside the tube 15. The lower chamber 49 is divided from the reservoir chamber 19 by the cage body 25. In other words, the cage body 25 partitions the inner chamber 18 inside the cylinder 17 into the bottom chamber 42 of the reservoir chamber 19 and the lower chamber 49.

In the cylinder 17, the upper chamber 48 and the lower chamber 49 are filled with oil fluid L as a working fluid. Also, in the cylinder 17, the reservoir chamber 19 is filled with a gas G and the oil fluid Las working fluids.

The shock absorber 11 includes a rod 50.

The rod 50 includes a main shaft part 51 and a mounting shaft part 52.

The mounting shaft part 52 has an outer diameter smaller than an outer diameter of the main shaft part 51. The mounting shaft part 52 is provided at one end of the main shaft part 51 in the axial direction.

The mounting shaft part 52 at one end of the rod 50 in the axial direction is connected to the piston 45, and the main shaft part 51 at the other side of the rod 50 in the axial direction extends from the shell 16 of the cylinder 17 to the outside through the opening 23. The piston assembly 44 including the piston 45 on the mounting shaft part 52 is connected to the rod 50 by a nut 53. The main shaft part 51 of the rod 50 extends to the outside from the tube 15 and the shell 16 through the rod guide 26 and the seal member 39. The rod 50 moves integrally with the piston 45 in the axial direction with respect to the tube 15 and the shell 16 while the main shaft part 51 is guided by the rod guide 26. The seal member 39 closes a space between the opening 23 of the shell 16 and the rod 50 to restrict leakage of the oil fluid L in the tube 15 and the gas G and the oil fluid L in the reservoir chamber 19 to the outside.

In the shock absorber 11, a portion of the rod 50 extending from the cylinder 17 is disposed on an upper portion to be connected to a vehicle body side of a vehicle. At the same time, in the shock absorber 11, the side wall part 21 of the shell 16 is disposed on a lower portion to be connected to a wheel side of the vehicle.

A passage 55 and a passage 56 penetrating in the axial direction are formed in the piston 45. The passages 55 and 56 allow the upper chamber 48 and the lower chamber 49 to communicate with each other. The passages 55 and 56 are passages through which the oil fluid L flows.

The piston assembly 44 includes a disc valve 57 and a disc valve 58.

The disc valve 57 has an annular shape and is provided on a side of the piston 45 opposite to the bottom part 22 in the axial direction. The disc valve 57 closes the passage 55 by coming into contact with the piston 45. The passage 55 is always open to the lower chamber 49.

The disc valve 58 has an annular shape and is provided on the bottom part 22 side of the piston 45 in the axial direction. The disc valve 58 closes the passage 56 by coming into contact with the piston 45. The passage 56 is always open to the upper chamber 48.

The disc valves 57 and 58 are connected to the mounting shaft part 52 of the rod 50 together with the piston 45.

A direction in which the rod 50 increases an amount of entry into the tube 15 and the shell 16, that is, the cylinder 17, is a compression side in which the entire length of the shock absorber 11 is reduced. When a pressure in the lower chamber 49 becomes higher than a pressure in the upper chamber 48 by a predetermined value or higher in a compression stroke in which the rod 50 moves to the compression side to move the piston 45 in a direction that reduces the lower chamber 49, the disc valve 57 opens the passage 55. Thereby, the oil fluid L in the lower chamber 49 flows into the upper chamber 48 through the passage 55. The disc valve 57 serves as a damping valve that generates a damping force at that time. A fixed orifice (not shown) is formed in at least one of the piston 45 and the disc valve 57. The fixed orifice allows the lower chamber 49 and the upper chamber 48 to communicate with each other via the passage 55 even in a state in which the disc valve 57 has closed the passage 55 to the maximum.

A direction in which the rod 50 increases a protrusion amount from the inside of the tube 15 and the shell 16, that is, the inside of the cylinder 17, is an extension side in which the entire length of the shock absorber 11 increases. When a pressure in the upper chamber 48 becomes higher than a pressure in the lower chamber 49 by a predetermined value or higher in an extension stroke in which the rod 50 moves to the extension side to move the piston 45 in a direction that reduces the upper chamber 48, the disc valve 58 opens the passage 56. Thereby, the oil fluid L in the upper chamber 48 flows into the lower chamber 49 through the passage 56. The disc valve 58 serves as a damping valve that generates a damping force at that time. A fixed orifice (not shown) is formed in at least one of the piston 45 and the disc valve 58. The fixed orifice allows the upper chamber 48 and the lower chamber 49 to communicate with each other via the passage 56 even in a state in which the disc valve 58 has closed the passage 56 to the maximum.

Figure 2:
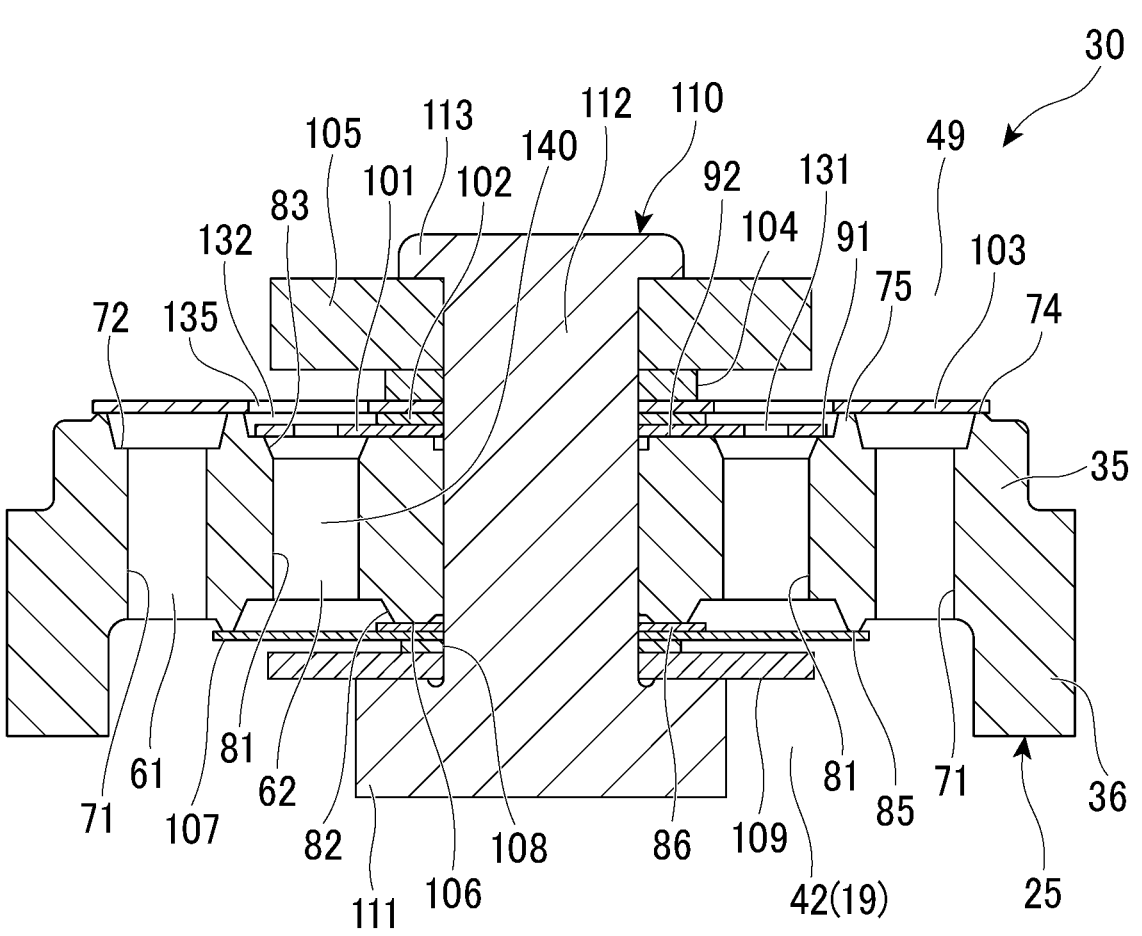
FIG. 2 is a cross-sectional view showing a body valve assembly of the shock absorber of the first embodiment according to the present invention.

As shown in FIG. 2, the cage body 25 includes a first passage 61 and a second passage 62 at positions of the partition part 35. Both the first passage 61 and the second passage 62 penetrate the partition part 35 in an axial direction of the partition part 35. The first passage 61 and the second passage 62 allow the lower chamber 49 to communicate with the bottom chamber 42 of the reservoir chamber 19. The oil fluid L flows through the first passage 61 and the second passage 62. The first passage 61 is provided on an outer side of the second passage 62 in a radial direction of the cage body 25.

The first passage 61 includes a first passage hole 71 and a first annular groove 72.

Figure 3:
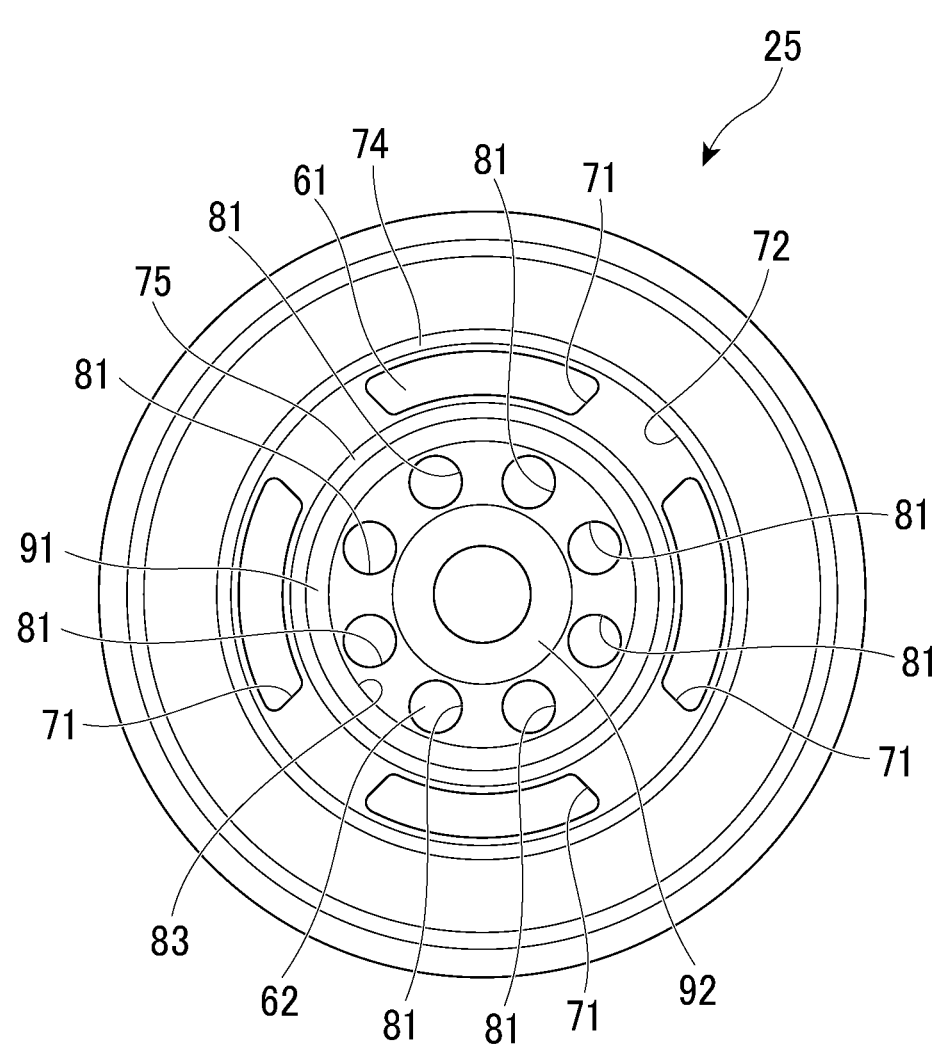
FIG. 3 is a plan view showing a cage body of the shock absorber of the first embodiment according to the present invention.

As shown in FIG. 3, the first passage 61 has a plurality, specifically four, of first passage holes 71. The plurality of first passage holes 71 have the same arcuate shape and are all elongated holes that are long in a circumferential direction of the cage body 25. All the plurality of first passage holes 71 extend in an axial direction of the cage body 25. The plurality of first passage holes 71 are disposed at regular intervals in the circumferential direction of the cage body 25 while positions thereof in the radial direction of the cage body 25 are aligned.

As shown in FIG. 2, the first annular groove 72 is provided at end portions of the plurality of first passage holes 71 on the lower chamber 49 side and extends in the circumferential direction of the cage body 25 to connect the plurality of first passage holes 71. Therefore, the first annular groove 72 has an annular shape and allows end portions of the plurality of first passage holes 71 on the lower chamber 49 side to communicate with each other. The plurality of first passage holes 71 open to a bottom surface of the first annular groove 72.

The cage body 25 includes an outer seat part 74 (first seat part) and an inner seat part 75 (first seat part).

The outer seat part 74 has an annular shape and protrudes from the bottom surface of the first annular groove 72 to the lower chamber 49 side in the axial direction of the cage body 25. The outer seat part 74 surrounds an outer side of the first annular groove 72 in the radial direction of the cage body 25. Therefore, the outer seat part 74 is provided to surround the end portion of the first passage 61 on the lower chamber 49 side from the outer side in the radial direction of the cage body 25.

The inner seat part 75 is provided apart from the outer seat part 74 on an inner side of the outer seat part 74 in the radial direction of the cage body 25. The inner seat part 75 has an annular shape and protrudes from the bottom surface of the first annular groove 72 to the lower chamber 49 side in the axial direction of the cage body 25. The inner seat part 75 is provided coaxially with the outer seat part 74. The inner seat part 75 surrounds an inner side of the first annular groove 72 in the radial direction of the cage body 25. Therefore, the inner seat part 75 is provided to surround the end portion of the first passage 61 on the lower chamber 49 side from an inner side in the radial direction of the cage body 25. End portions of the outer seat part 74 and the inner seat part 75 on the lower chamber 49 side are aligned in position in the axial direction of the cage body 25.

The second passage 62 includes a second passage hole 81, a second annular groove 82, and a third annular groove 83.

As shown in FIG. 3, the second passage 62 has a plurality, specifically eight, of second passage holes 81. The plurality of second passage holes 81 are round holes of the same shape and all extend in the axial direction of the cage body 25. The plurality of second passage holes 81 are disposed at regular intervals in the circumferential direction of the cage body 25 while positions thereof in the radial direction of the cage body 25 are aligned.

As shown in FIG. 2, the second annular groove 82 is provided at end portions of the plurality of second passage holes 81 on the bottom chamber 42 side and extends in circumferential direction of the cage body 25 to connect the plurality of second passage holes 81. Therefore, the second annular groove 82 has an annular shape and allows end portions of the plurality of second passage holes 81 on the bottom chamber 42 side to communicate with each other. The second annular groove 82 is on an inner side of the first passage holes 71 in the radial direction of the cage body 25. The second passage holes 81 open to a bottom surface of the second annular groove 82.

The cage body 25 includes a seat part 85 (second seat part) and a fixed seat part 86.

The seat part 85 has an annular shape and protrudes from the bottom surface of the second annular groove 82 to the bottom chamber 42 side in the axial direction of the cage body 25. The seat part 85 surrounds an outer side of the second annular groove 82 in the radial direction of the cage body 25. Therefore, the seat part 85 is provided to surround an end portion of the second passage 62 on the bottom chamber 42 side from the outer side in the radial direction of the cage body 25.

The fixed seat part 86 is provided apart from the seat part 85 on an inner side of the seat part 85 in the radial direction of the cage body 25. The fixed seat part 86 has an annular shape and protrudes from the bottom surface of the second annular groove 82 to the bottom chamber 42 side in the axial direction of the cage body 25. The fixed seat part 86 is provided coaxially with the seat part 85. The fixed seat part 86 surrounds an inner side of the second annular groove 82 in the radial direction of the cage body 25. Therefore, the fixed seat part 86 is provided to surround the end portion of the second passage 62 on the bottom chamber 42 side from an inner side in the radial direction of the cage body 25. A position of the end portion of the fixed seat part 86 on the bottom chamber 42 side in the axial direction of the cage body 25 is positioned on the lower chamber 49 side with respect to a position of the end portion of the seat part 85 on the bottom chamber 42 side in the axial direction of the cage body 25.

The third annular groove 83 is provided at end portions of the plurality of second passage holes 81 on the lower chamber 49 side and extends in the circumferential direction of the cage body 25 to connect the plurality of second passage holes 81. Therefore, the third annular groove 83 has an annular shape and allows the end portions of the plurality of second passage holes 81 on the lower chamber 49 side to communicate with each other. The entire third annular groove 83 is on an inner side of the first annular groove 72 in the radial direction of the cage body 25. The second passage holes 81 open to a bottom surface of the third annular groove 83.

The cage body 25 includes a land part 91 and a fixed seat part 92.

The land part 91 has an annular shape and is disposed inward of the inner seat part 75 in the radial direction of the cage body 25. The land part 91 protrudes from the bottom surface of the third annular groove 83 to the lower chamber 49 side in the axial direction of the cage body 25. The land part 91 surrounds an outer side of the third annular groove 83 in the radial direction of the cage body 25. Therefore, the land part 91 is provided to surround the end portion of the second passage 62 on the lower chamber 49 side from the outer side in the radial direction of the cage body 25. The land part 91 is disposed coaxially with the inner seat part 75 on an inner side of the inner seat part 75 in the radial direction. A position of the end portion of the land part 91 on the lower chamber 49 side in the axial direction of the cage body 25 is positioned on the bottom chamber 42 side with respect to a position of the end portion of the inner seat part 75 on the lower chamber 49 side in the axial direction of the cage body 25. The land part 91 is continuously adjacent to the inner seat part 75 in the radial direction of the cage body 25.

The fixed seat part 92 is provided apart from the land part 91 on an inner side of the land part 91 in the radial direction of the cage body 25. The fixed seat part 92 has an annular shape and protrudes from the bottom surface of the third annular groove 83 to the lower chamber 49 side in the axial direction of the cage body 25. The fixed seat part 92 is provided coaxially with the land part 91. The fixed seat part 92 surrounds an inner side of the third annular groove 83 in the radial direction of the cage body 25. Therefore, the fixed seat part 92 is provided to surround the end portion of the second passage 62 on the lower chamber 49 side from an inner side in the radial direction of the cage body 25. End portions of the fixed seat part 92 and the land part 91 on the lower chamber 49 side are aligned in position in the axial direction of the cage body 25.

The body valve assembly 30 includes a passage adjusting disc 101, a first height adjusting disc 102, a first valve 103, a first small diameter disc 104, and a first washer 105 on the lower chamber 49 side in the axial direction of the cage body 25. Also the body valve assembly 30 includes a second height adjusting disc 106, a second valve 107, a second small diameter disc 108, and a second washer 109 on the bottom chamber 42 side in the axial direction of the cage body 25. The second height adjusting disc 106, the second valve 107, the second small diameter disc 108, and the second washer 109 are all provided on an inner side of the leg part 36 in the radial direction of the cage body 25.

The body valve assembly 30 includes a pin member 110 that attaches the passage adjusting disc 101, the first height adjusting disc 102, the first valve 103, the first small diameter disc 104, the first washer 105, the second height adjusting disc 106, the second valve 107, the second small diameter disc 108, and the second washer 109 to the cage body 25.

The passage adjusting disc 101, the first height adjusting disc 102, the first valve 103, the first small diameter disc 104, the first washer 105, the second height adjusting disc 106, the second valve 107, the second small diameter disc 108, the second washer 109, and the pin member 110 are all made of a metal.

The passage adjusting disc 101, the first height adjusting disc 102, the first valve 103, the first small diameter disc 104, the second height adjusting disc 106, the second valve 107, the second small diameter disc 108, and the second washer 109 are all formed by punching a plate material with a press.

The pin member 110 includes a support part 111, a shaft part 112 and a flange part 123. The support part 111 has a disc shape. The shaft part 112 has a columnar shape with an outer diameter smaller than an outer diameter of the support part 111. The shaft part 112 extends in an axial direction of the support part 111 from one end of the support part 111 in the axial direction. The flange part 113 extends outward in a radial direction of the shaft part 112 from an end portion of the shaft part 112 on a side opposite to the support part 111 in the axial direction.

The passage adjusting disc 101, the first height adjusting disc 102, the first valve 103, the first small diameter disc 104, the first washer 105, the second height adjusting disc 106, the second valve 107, the second small diameter disc 108, and the second washer 109 all have an annular shape and a flat pate shape.

The shaft part 112 of the pin member 110 is fitted to a radially inner side of all the cage body 25, the passage adjusting disc 101, the first height adjusting disc 102, the first valve 103, the first small diameter disc 104, the first washer 105, the second height adjusting disc 106, the second valve 107, the second small diameter disc 108, and the second washer 109.

Here, in the pin member 110, the flange part 113 is not formed on the shaft part 112 in a state before the cage body 25, the passage adjusting disc 101, the first height adjusting disc 102, the first valve 103, the first small diameter disc 104, the first washer 105, the second height adjusting disc 106, the second valve 107, the second small diameter disc 108, and the second washer 109 are attached. Then, the second washer 109, the second small diameter disc 108, the second valve 107, the second height adjusting disc 106, the cage body 25, the passage adjusting disc 101, the first height adjusting disc 102, the first valve 103, the first small diameter disc 104, and the first washer 105 are placed in that order on the support part 111 of the pin member 110 while the shaft part 112 in a state before the flange part 113 of the pin member 110 is formed as described above is fitted inside each of them. Then, in this state, the flange part 113 is formed on the shaft part 112 of the pin member 110 by swaging. Thereby, the second washer 109, the second small diameter disc 108, the second valve 107, the second height adjusting disc 106, the cage body 25, the passage adjusting disc 101, the first height adjusting disc 102, the first valve 103, the first small diameter disc 104, and the first washer 105 are clamped in the axial direction with at least each inner circumferential portion thereof sandwiched between the support part 111 and the flange part 113.

Figure 4:
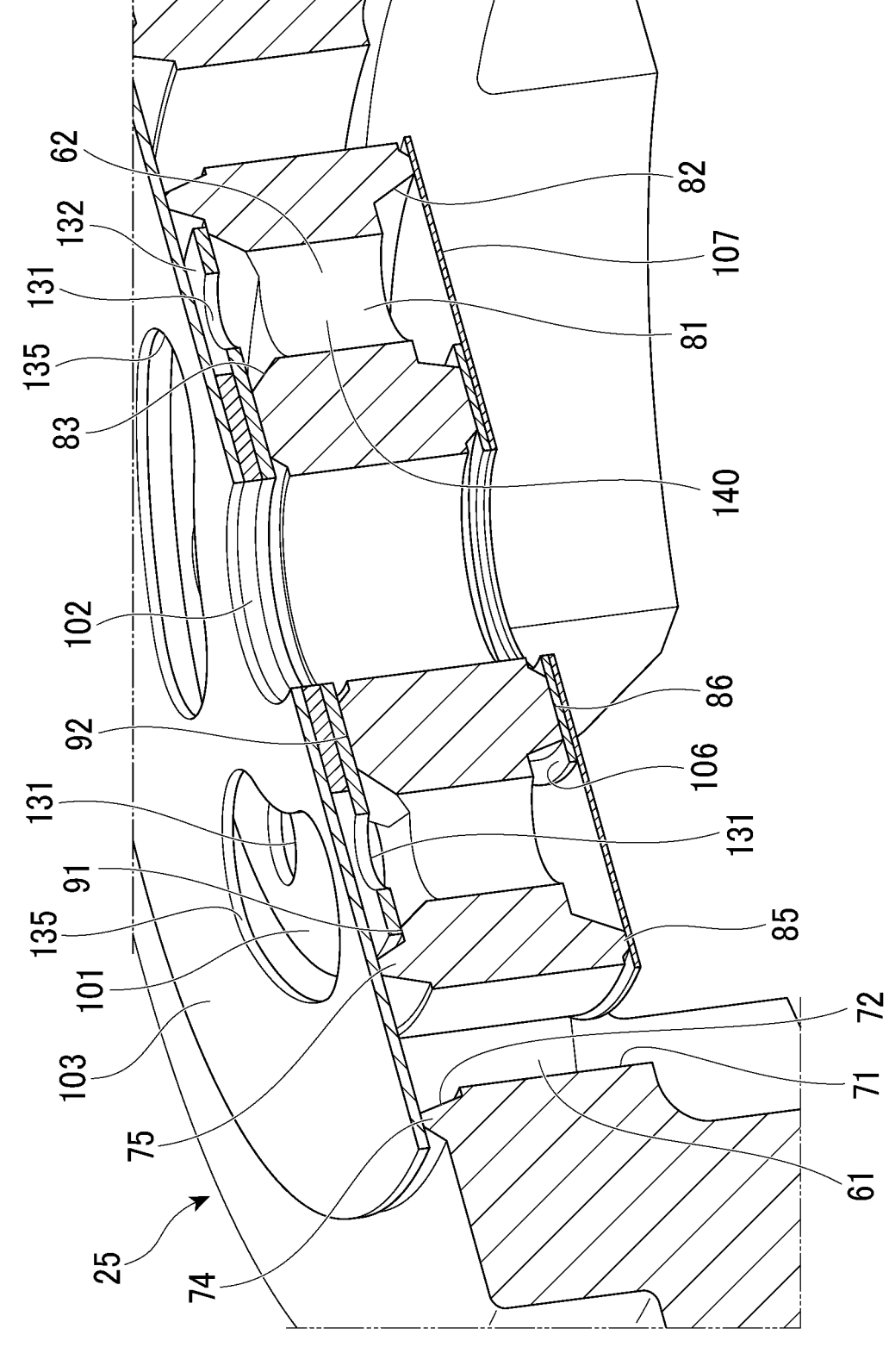
FIG. 4 is a cross-sectional perspective view showing a portion of components of the body valve assembly of the shock absorber of the first embodiment according to the present invention.

The passage adjusting disc 101 has an outer diameter larger than a diameter of an outer end of the third annular groove 83 in the radial direction, and is in contact with the land part 91 and the fixed seat part 92 of the cage body 25 as shown in FIG. 4. An outer circumferential portion of the passage adjusting disc 101 is in contact with the land part 91 of the cage body 25 over the entire circumference, and an inner circumferential portion thereof is in contact with the fixed seat part 92 over the entire circumference. In other words, the passage adjusting disc 101 covers an end portion of the second passage 62 on the lower chamber 49 side.

Figure 5:
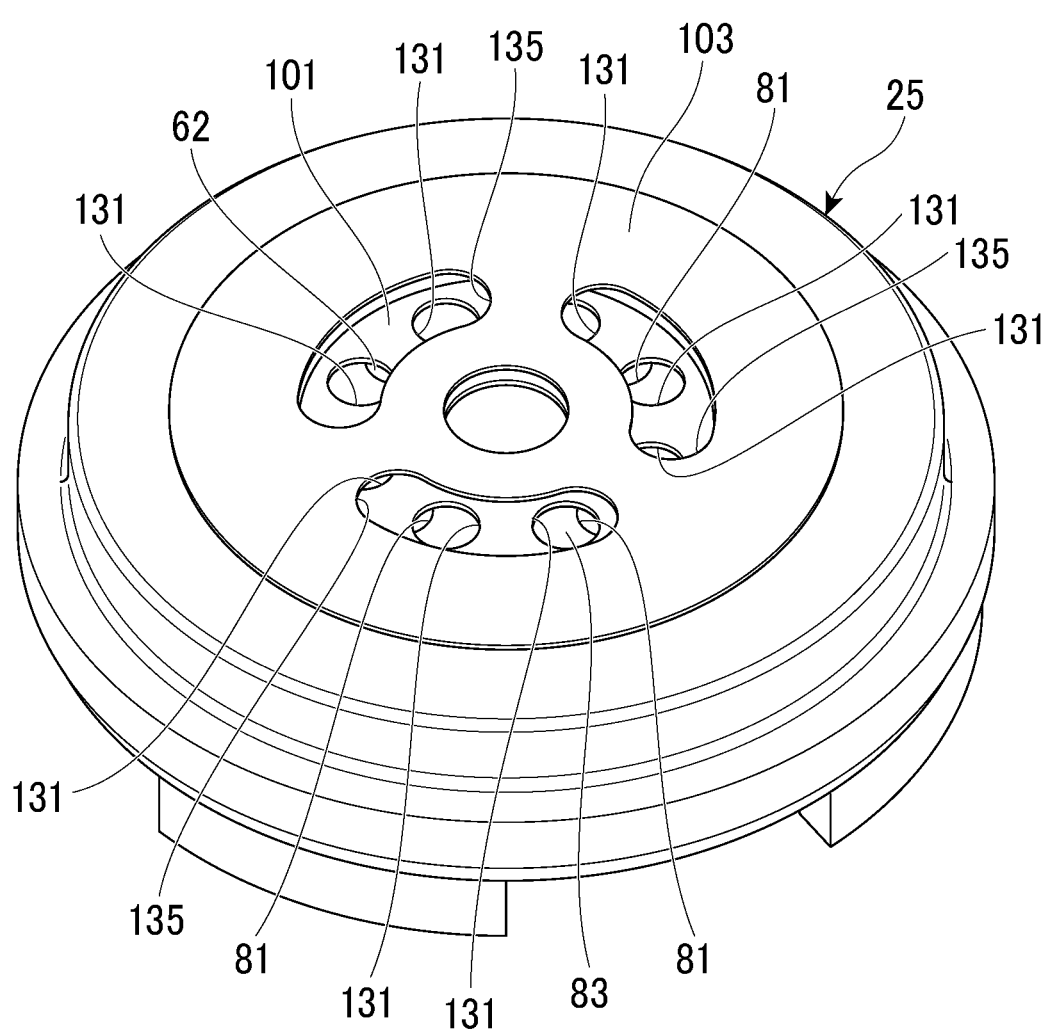
FIG. 5 is a perspective view showing a portion of components of the body valve assembly of the shock absorber of the first embodiment according to the present invention.

The passage adjusting disc 101 includes a plurality of through holes 131, specifically eight through holes 131 as shown in FIG. 5, penetrating in the axial direction between the outer circumferential portion and the inner circumferential portion thereof. The through holes 131 are circular holes of the same shape. The plurality of through holes 131 are disposed at regular intervals in the circumferential direction of the passage adjusting disc 101 while positions thereof in the radial direction of the passage adjusting disc 101 are aligned. As shown in FIG. 2, the plurality of through holes 131 are disposed in the passage adjusting disc 101 between a portion in contact with the land part 91 and a portion in contact with the fixed seat part 92 in the radial direction of the cage body 25. In other words, the plurality of through holes 131 are disposed within a range of the third annular groove 83 of the second passage 62 in the radial direction of the cage body 25.

The first height adjusting disc 102 has an outer diameter smaller than a diameter of an inner end of the third annular groove 83 in the radial direction and is in contact with the passage adjusting disc 101. Therefore, the first height adjusting disc 102 does not cover the plurality of through holes 131 of the passage adjusting disc 101. A passage chamber 132 between the inner seat part 75 and the first height adjusting disc 102 in the radial direction of the cage body 25 communicates with the second passage 62 via passages in the plurality of through holes 131. The passage adjusting disc 101 is provided in the passage chamber 132.

The first valve 103 is a disc valve formed of one disc. The first valve 103 has an outer diameter slightly larger than an outer diameter of the outer seat part 74 of the cage body 25. The first valve 103 is in contact with the outer seat part 74 and the inner seat part 75 of the cage body 25 and the first height adjusting disc 102. An outer circumferential portion of the first valve 103 is in contact with the outer seat part 74 of the cage body 25 over the entire circumference, an intermediate portion thereof in the radial direction is in contact with the inner seat part 75 over the entire circumference, and an inner circumferential portion thereof is in contact with the first height adjusting disc 102 over the entire circumference. The first valve 103 comes into contact with the outer seat part 74 and the inner seat part 75 to close the first passage 61, and is separated from at least the outer seat part 74 to open the first passage 61. The first passage 61 is in constant communication with the bottom chamber 42, and therefore the first passage 61 allows communication between the bottom chamber 42 and the lower chamber 49 when the first valve 103 opens. The first passage 61 is an extension side passage through which the oil fluid L flows during an extension stroke in which the piston 45 and the rod 50 shown in FIG. 1 move to the extension side.

Here, if a thickness in the axial direction of the first height adjusting disc 102 shown in FIG. 2 is adjusted by a method of selecting one from the plurality of first height adjusting discs 102 having different thicknesses in the axial direction, a spring force generated when the first valve 103 comes into contact with the outer seat part 74 and the inner seat part 75 is adjusted, and a valve opening pressure is adjusted. That is, if a thickness of the first height adjusting disc 102 is made small, a spring force when the first valve 103 comes into contact with the outer seat part 74 and the inner seat part 75 increases, a valve opening pressure of the first valve 103 increases, and thereby a damping force generated when the valve opens increases.

The first valve 103 includes a plurality of communication holes 135, specifically three communication holes 135 as shown in FIG. 5, penetrating in the axial direction formed between an inner circumferential portion and an outer circumferential portion thereof. The plurality of communication holes 135 have the same arcuate shape, and are all elongated holes that are long in the circumferential direction of the first valve 103. The plurality of communication holes 135 are disposed at regular intervals in the circumferential direction of the first valve 103 while positions thereof in the radial direction of the first valve 103 are aligned. The plurality of communication holes 135 are disposed in the first valve 103 between a portion in contact with the inner seat part 75 and a portion in contact with the first height adjusting disc 102 of the cage body 25 as shown in FIG. 2. In other words, the communication holes 135 are disposed within a range of the passage chamber 132 in the radial direction of the cage body 25. The plurality of communication holes 135 are in constant communication with the second passage 62 via the passage chamber 132 and the passages in the plurality of through holes 131 of the passage adjusting disc 101. The passage adjusting disc 101 is provided between the first valve 103 and the cage body 25.

The first small diameter disc 104 is in contact with the first valve 103. The first small diameter disc 104 has an outer diameter smaller than a diameter of an inscribed circle of the plurality of communication holes 135 of the first valve 103. Therefore, the first small diameter disc 104 does not cover passages in the plurality of communication holes 135.

The first washer 105 is in contact with the flange part 113 of the pin member 110 and the first small diameter disc 104. The first washer 105 has an outer diameter larger than an outer diameter of the first small diameter disc 104 and larger than an outer diameter of the flange part 113. The first washer 105 has an outer diameter smaller than an inner diameter of the inner seat part 75 of the cage body 25.

The second height adjusting disc 106 is in contact with the fixed seat part 86 of the cage body 25. The second height adjusting disc 106 has an outer diameter smaller than a diameter of an inscribed circle of the plurality of second passage holes 81. Therefore, the second height adjusting disc 106 does not cover the plurality of second passage holes 81. A space between the second height adjusting disc 106 and the seat part 85 in the radial direction of the cage body 25 serves as a part of the second passage 62.

The second valve 107 is a disc valve formed of one disc. The second valve 107 has an outer diameter slightly larger than an outer diameter of the seat part 85 of the cage body 25. The second valve 107 is in contact with the seat part 85 of the cage body 25 and the second height adjusting disc 106. An outer circumferential portion of the second valve 107 is in contact with the seat part 85 of the cage body 25 over the entire circumference, and an inner circumferential portion thereof is in contact with the second height adjusting disc 106 over the entire circumference. The second valve 107 comes into contact with the seat part 85 to close the second passage 62 and is separated from the seat part 85 to open the second passage 62.

The second passage 62 provided in the cage body 25, the passages in the plurality of through holes 131 provided in the passage adjusting disc 101, the passage chamber 132, and the passages in the plurality of communication holes 135 provided in the first valve 103 form a compression side passage 140 shown in FIG. 2 through which the oil fluid L flows during the compression stroke in which the piston 45 and the rod 50 shown in FIG. 1 move to the compression side. One end of the compression side passage 140 is in constant communication with the lower chamber 49, and the other end thereof is opened and closed by the second valve 107. When the second valve 107 opens, the compression side passage 140 including the second passage 62 allows communication between the lower chamber 49 and the bottom chamber 42.

Here, when a thickness of the second height adjusting disc 106 in the axial direction is adjusted by a method of selecting one from the plurality of second height adjusting discs 106 having different thicknesses in the axial direction, a spring force generated when the second valve 107 comes into contact with the seat part 85 is adjusted, and a valve opening pressure is adjusted. That is, if the thickness of the second height adjusting disc 106 is made small, a spring force when the second valve 107 comes into contact with the seat part 85 increases, a valve opening pressure of the second valve 107 increases, and thereby a damping force generated when the valve opens increases.

The second small diameter disc 108 is in contact with the second valve 107. The second small diameter disc 108 has an outer diameter smaller than an outer diameter of the second height adjusting disc 106.

The second washer 109 is in contact with the second small diameter disc 108 and the support part 111 of the pin member 110. The second washer 109 has an outer diameter larger than an outer diameter of the second small diameter disc 108 and larger than an outer diameter of the support part 111. The second washer 109 has an outer diameter smaller than an inner diameter of the seat part 85 of the cage body 25.

Here, in the compression side passage 140 including the second passage 62 provided in the cage body 25, the passages in the plurality of through holes 131 provided in the passage adjusting disc 101, the passage chamber 132, and the passages in the plurality of communication holes 135 provided in the first valve 103, the passages in the plurality of through holes 131 provided in the passage adjusting disc 101 have a smallest flow path area. Therefore, in the passage adjusting disc 101, the passages in the plurality of through holes 131 reduce the second passage 62, and reduce the passage chamber 132 and the passages in the plurality of communication holes 135.

In the shock absorber 11, the rod 50 shown in FIG. 1 moves to the compression side and the piston 45 moves in a direction that reduces the lower chamber 49. Thereby, when a pressure in the lower chamber 49 becomes higher than a pressure in the reservoir chamber 19 by a predetermined value or higher, the body valve assembly 30 shown in FIG. 2 deforms so that an outer circumferential side of the second valve 107 is separated in the axial direction from the cage body 25. As a result, the second valve 107 is separated from the seat part 85 to open the compression side passage 140 including the second passage 62. Then, the oil fluid L flows from the lower chamber 49 into the bottom chamber 42 of the reservoir chamber 19 through the compression side passage 140, that is, the passages in the plurality of communication holes 135 provided in the first valve 103, the passage chamber 132, the passages in the plurality of through holes 131 provided in the passage adjusting disc 101, and the second passage 62 provided in the cage body 25. The second valve 107 is a damping valve that generates a damping force when the oil fluid L is allowed to flow from the lower chamber 49 into the bottom chamber 42 of the reservoir chamber 19 by opening as described above. The second washer 109 is in contact with the second valve 107 to suppress deformation of the second valve 107 provided between itself and the cage body 25.

In the shock absorber 11, the rod 50 shown in FIG. 1 moves to the extension side and the piston 45 moves to the upper chamber 48 side. Thereby, if a pressure in the lower chamber 49 becomes lower than a pressure in the reservoir chamber 19, the body valve assembly 30 shown in FIG. 2 is deformed so that an outer circumferential side of the first valve 103 is separated from the cage body 25 in the axial direction. As a result, the first valve 103 is separated from at least the outer seat part 74 to open the first passage 61. Then, the oil fluid L flows from the bottom chamber 42 of the reservoir chamber 19 toward the lower chamber 49 through the first passage 61 of the cage body 25. The first valve 103 opens the first passage 61 when the rod 50 moves to the extension side to allow the oil fluid L to flow from the reservoir chamber 19 into the lower chamber 49 through the first passage 61. When the oil fluid L is allowed to flow from the bottom chamber 42 of the reservoir chamber 19 into the lower chamber 49 by opening the first valve 103 as described above, the first valve 103 serves as a suction valve that does not substantially generate a damping force. Further, the first valve 103 may be used as a damping valve that generates a damping force when the oil fluid L is allowed to flow from the reservoir chamber 19 into the lower chamber 49 by opening the first valve 103. The first washer 105 is in contact with the first valve 103 to suppress deformation of the first valve 103 provided between itself and the cage body 25.

As shown in FIG. 1, a locking member 141 is fixed to the rod 50 at a position between the piston assembly 44 of the main shaft part 51 and the rod guide 26. A buffer member 142 is provided on the rod 50 between the locking member 141 and the rod guide 26. The buffer member 142 is in contact with the locking member 141. When the rod 50 is positioned at a fully extended position on the extension side, further movement of the locking member 141 to the extension side is restricted by the rod guide 26. At that time, the buffer member 142 is brought into contact with the rod guide 26 to alleviate the impact.

Patent Document 1 discloses a shock absorber including a valve assembly that has valve discs on both sides of a valve body. In this type of shock absorber, there are cases in which a flow path area of a passage in the valve body is changed to change valve opening characteristics of a valve disc of the valve assembly. In order to change a flow path area of the passage in the valve body, a valve body having that flow path area is required. Therefore, in order to prepare a plurality of types of valve assemblies having valve discs with different valve opening characteristics, it is necessary to prepare a plurality of types of valve bodies, and this will cause an increase in cost.

In the shock absorber 11 of the first embodiment, the cage body 25 partitioning the inner chamber 18 of the cylinder 17 into the lower chamber 49 and the bottom chamber 42 includes the first passage 61 that allows communication between the lower chamber 49 and the bottom chamber 42, the outer seat part 74 and the inner seat part 75 provided to surround an end portion of the first passage 61 on the lower chamber 49 side, the second passage 62 that allows communication between the lower chamber 49 and the bottom chamber 42, and the seat part 85 provided to surround an end portion of the second passage 62 on the bottom chamber 42 side. Also, the shock absorber 11 includes the first valve 103 which comes into contact with the outer seat part 74 and the inner seat part 75 to close the first passage 61, is separated from at least the outer seat part 74 to open the first passage 61, and in which the communication holes 135 communicating with the second passage 62 are formed, and the second valve 107 which comes into contact with the seat part 85 to close the second passage 62 and is separated from the seat part 85 to open the second passage 62.

Then, the shock absorber 11 includes the passage adjusting disc 101 that reduces the second passage 62 provided between the first valve 103 and the cage body 25. Therefore, in the shock absorber 11, even when a flow path area of the compression side passage 140 of the cage body 25 is changed to change valve opening characteristics of the second valve 107, all that is required is to change the relatively inexpensive passage adjusting disc 101 instead of changing the flow path area of the second passage 62 of the cage body 25. Therefore, when a plurality of types of relatively inexpensive passage adjusting discs 101 are prepared for one type of cage body 25, the flow path area of the compression side passage 140 can be changed. Accordingly, if a plurality of types of passage adjusting discs 101 are prepared for one type of cage body 25, a plurality of types of valve assemblies 30 having different valve opening characteristics of the second valve 107 can be prepared. Therefore, an increase in types of the cage body 25 can be suppressed, and an increase in manufacturing costs and management costs of the cage body 25 can be suppressed. Therefore, an increase in cost of the shock absorber 11 can be suppressed.

Figure 6:
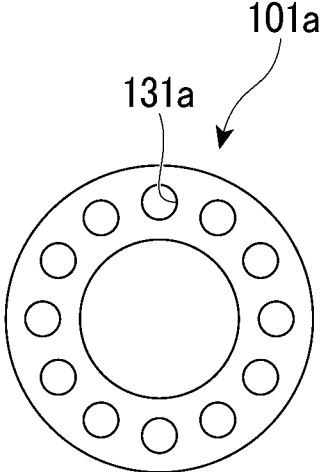
FIG. 6 is a plan view showing another passage adjusting disc of the shock absorber of the first embodiment according to the present invention.
Figure 7:
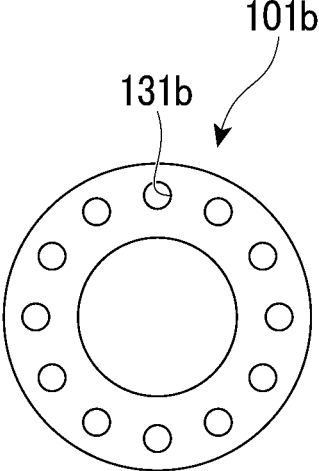
FIG. 7 is a plan view showing yet another passage adjusting disc of the shock absorber of the first embodiment according to the present invention.
Figure 8:
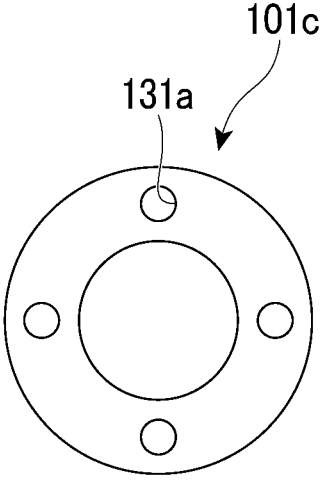
FIG. 8 is a plan view showing still another passage adjusting disc of the shock absorber of the first embodiment according to the present invention.

Also, in the shock absorber 11, since the passage adjusting disc 101 is annular and has the through holes 131 penetrating in the axial direction between an inner circumferential portion and an outer circumferential portion thereof, if a plurality of types of passage adjusting discs with different through holes 131 are prepared, a flow path area of the compression side passage 140 can be changed. However, in any case, the passage adjusting disc is set to reduce the second passage 62. A plurality of types of passage adjusting discs according to required valve opening characteristics of the second valve 107 having the same outer diameter, having the same inner diameter, and being different in at least one of the number of through holes and the inner diameter of the through hole are prepared including such cases in which, for example, a passage adjusting disc 101a having 12 through holes 131a which are larger in number than the through holes 131 of the passage adjusting disc 101 and have an inner diameter smaller than that of the through holes 131 as shown in FIG. 6 is prepared with respect to the passage adjusting disc 101 having eight through holes 131 shown in FIG. 5, a passage adjusting disc 101b having 12 through holes 131b which are the same in number as the through holes 131a of the passage adjusting disc 101a and have an inner diameter smaller than that of the through holes 131a as shown in FIG. 7 is prepared with respect to the passage adjusting disc 101a having 12 through holes 131a, and a passage adjusting disc 101c having four through holes 131a which are smaller in number than the through holes 131a of the passage adjusting disc 101a and have the same inner diameter as shown in FIG. 8 is prepared with respect to passage adjusting disc 101a having 12 through holes 131a shown in FIG. 6. The passage adjusting discs 101a to 101c are also formed by punching a plate material with a press.

The first embodiment can also be changed as described in the following modified example 1.

Modified Example 1

Figure 9:
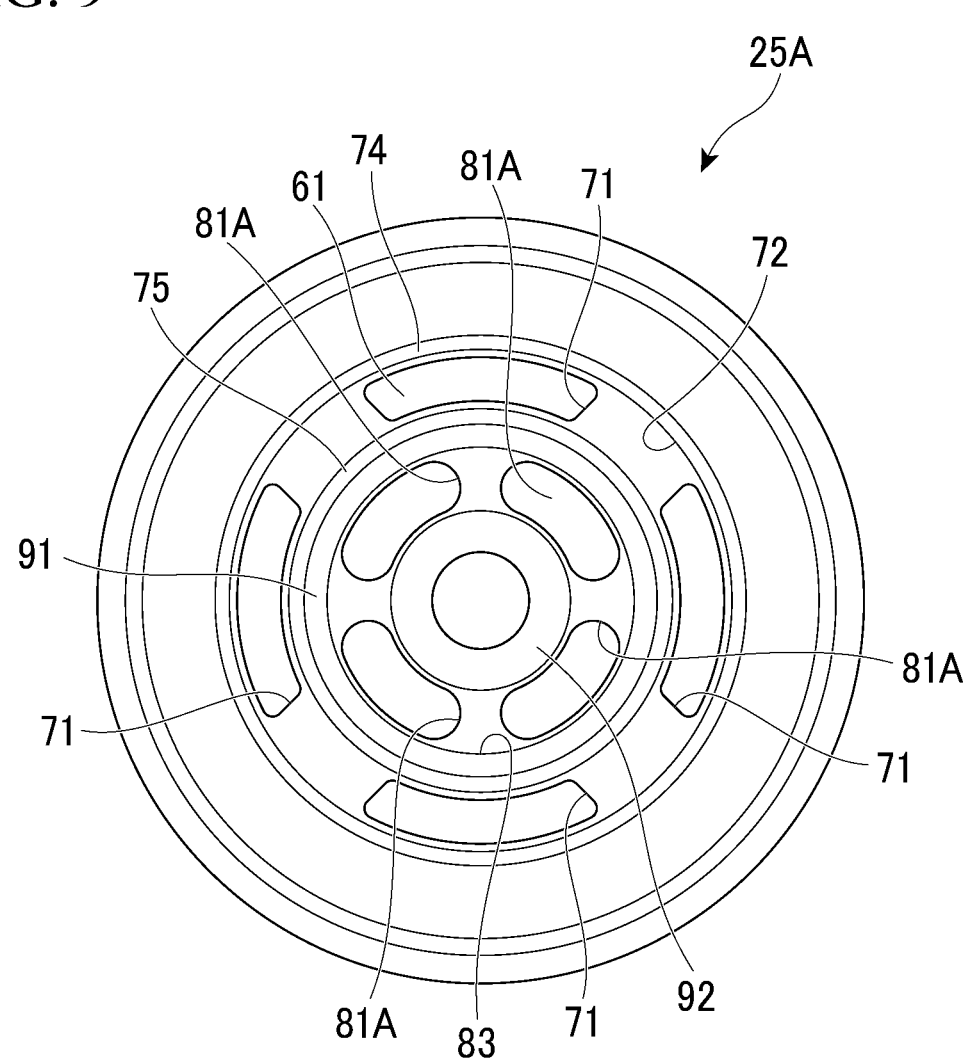
FIG. 9 is a plan view showing modified example 1 of the cage body of the shock absorber of the first embodiment according to the present invention.

In modified example 1, as shown in FIG. 9, a cage body 25A that is partially different from the cage body 25 is used instead of the cage body 25. Instead of the second passage hole 81, the cage body 25A uses a second passage hole 81A, which is different from the second passage hole 81, to open to the bottom surface of the third annular groove 83. The second passage hole 81A has an arcuate shape, and are elongated holes that are long in the circumferential direction of the cage body 25A. The second passage hole 81A also extends in the axial direction of the cage body 25A. In modified example 1, a plurality, specifically four, of second passage holes 81A having the same shape are provided in the cage body 25A. The plurality of second passage holes 81A are disposed at regular intervals in a circumferential direction of the cage body 25A while positions thereof in a radial direction of the cage body 25A are aligned. The plurality of second passage holes 81A are shifted in position from the plurality of first passage holes 71 in the circumferential direction of the cage body 25A.

Modified example 1 also achieves the same effects as in the first embodiment.

Second Embodiment

Next, a second embodiment will be described mainly on the basis of FIGS. 10 to 12, focusing on differences from the first embodiment. Further, parts common to those in the first embodiment will be denoted by the same terms and the same reference signs.

In the first embodiment, a case in which the passage adjusting disc 101 is not positioned in the circumferential direction of the cage body 25 with respect to the cage body 25 has been described as an example. In a case of such a configuration, due to a difference in a circumferential position of the passage adjusting disc 101 with respect to the cage body 25, a flow of the oil fluid L flowing from a plurality of through holes 131 of the passage adjusting disc 101 to the plurality of second passage holes 81 of the second passage 62 through the second annular groove 83 changes, and therefore there is a likelihood that valve opening characteristics of the second valve 107 will be slightly changed during the compression stroke. Therefore, in the second embodiment, valve opening characteristics of the second valve 107 during a compression stroke are made more stable than in the first embodiment.

Figure 10:
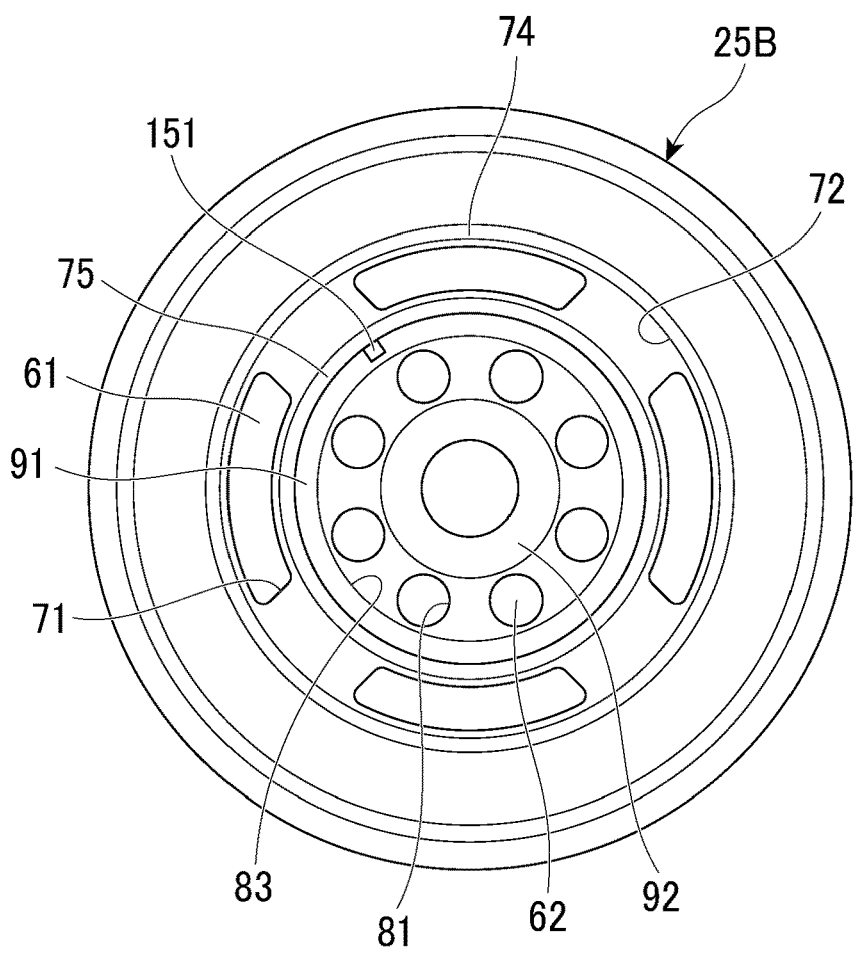
FIG. 10 is a plan view showing a cage body of a shock absorber of a second embodiment according to the present invention.

In the second embodiment, a cage body 25B that is partially different from the cage body 25 is used as shown in FIG. 10 instead of the cage body 25. In the cage body 25B, a protruding part 151 protruding from a land part 91 to a lower chamber 49 side in an axial direction of the cage body 25B is formed at a predetermined position of the land part 91.

Figure 11:
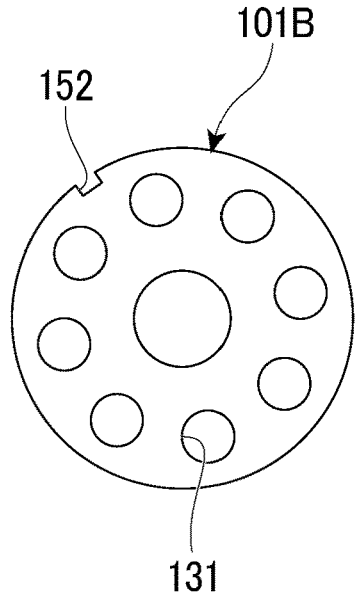
FIG. 11 is a plan view showing a passage adjusting disc of the shock absorber of the second embodiment according to the present invention.

In the second embodiment, as shown in FIG. 11, a passage adjusting disc 101B that is partially different from the passage adjusting disc 101 is used instead of the passage adjusting disc 101. A notch part 152 is formed in an outer circumferential portion of the passage adjusting disc 101B. The notch part 152 penetrates the passage adjusting disc 101B in an axial direction of the passage adjusting disc 101B and opens outward in a radial direction of the passage adjusting disc 101B. The notch part 152 is disposed at a central position between adjacent through holes 131 in a circumferential direction of the passage adjusting disc 101B. The passage adjusting disc 101B, including the notch part 152, is also formed by punching a plate material with a press.

Figure 12:
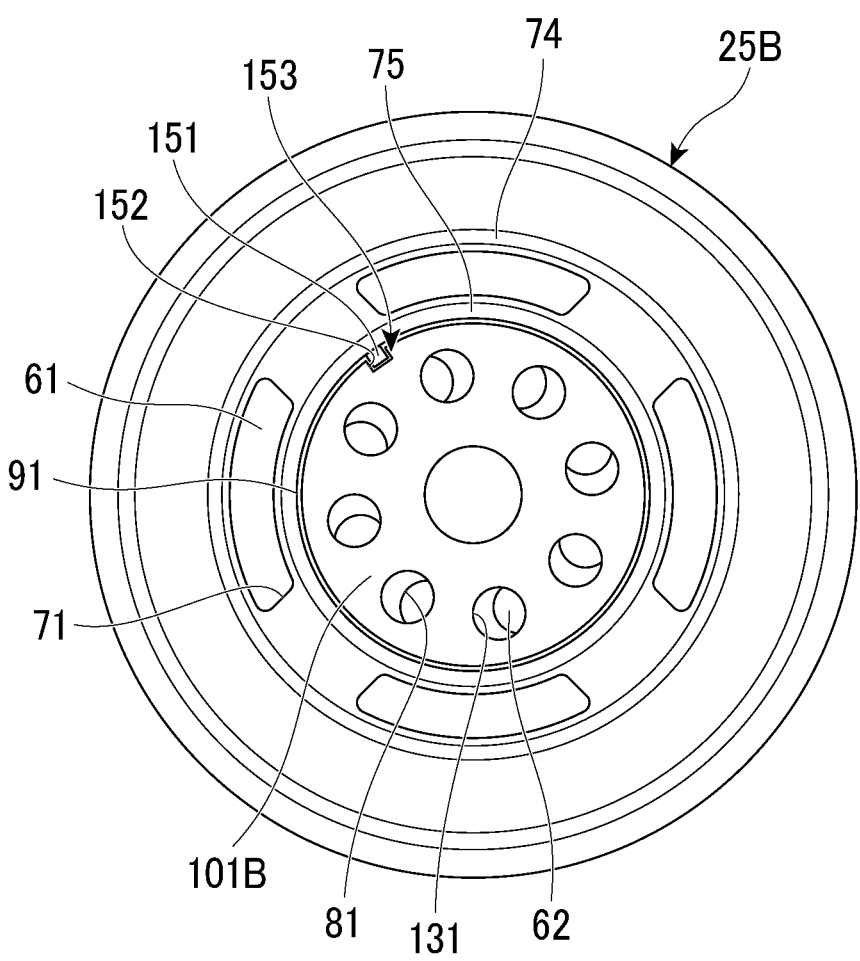
FIG. 12 is a plan view showing a state in which the passage adjusting disc is placed on the cage body of the shock absorber of the second embodiment according to the present invention.

Then, when the passage adjusting disc 101B is placed on the land part 91 and a fixed seat part 92 of the cage body 25B, the notch part 152 of the passage adjusting disc 101B is engaged with the protruding part 151 of the cage body 25B as shown in FIG. 12. Thereby, a positional relationship between the plurality of through holes 131 of the passage adjusting disc 101B and a plurality of second passage holes 81 of a second passage 62 in a circumferential direction of the cage body 25B can be made constant. The notch part 152 of the passage adjusting disc 101B and the protruding part 151 of the cage body 25B are provided in the cage body 25B and the passage adjusting disc 101B and are engaged with each other to constitute an engaging part 153 for positioning the passage adjusting disc 101B in the circumferential direction with respect to the cage body 25B.

Also in the second embodiment, in addition to the passage adjusting disc 101B, a plurality of passage adjusting discs including the notch part 152 and having a through hole that is different in at least one of the number and inner diameter from the through hole 131 are prepared to be used selectively.

In the second embodiment with the above configuration, the engaging part 153 is provided in the cage body 25B and the passage adjusting disc 101B to engage them with each other for positioning the passage adjusting disc 101B in the circumferential direction with respect to the cage body 25B. Therefore, a flow of an oil fluid L flowing from the plurality of through holes 131 of the passage adjusting disc 101B to the plurality of second passage holes 81 of the second passage 62 can be stabilized, and valve opening characteristics of the second valve 107 (see FIG. 2) during the compression stroke can be stabilized.

Here, in the second embodiment, the protruding part 151 can be formed in the cage body 25A of modified example 1 to be used instead of the cage body 25B.

Also, in the second embodiment, conversely, a protruding part protruding in the axial direction of the passage adjusting disc may be provided on an outer circumferential side of the passage adjusting disc, and a recessed part that is recessed in the axial direction of the cage body to be engaged with the protruding part may be provided on a land part of the cage body so that an engaging part is formed using the protruding part and the recessed part.

Third Embodiment

Next, a third embodiment will be described mainly on the basis of FIGS. 13 to 15, focusing on differences from the first embodiment. Further, parts common to those in the first embodiment will be denoted by the same terms and the same reference signs.

Similarly to the second embodiment, also in the third embodiment, valve opening characteristics of the second valve 107 (see FIG. 2) during a compression stroke are made more stable than in the first embodiment.

Figure 13:
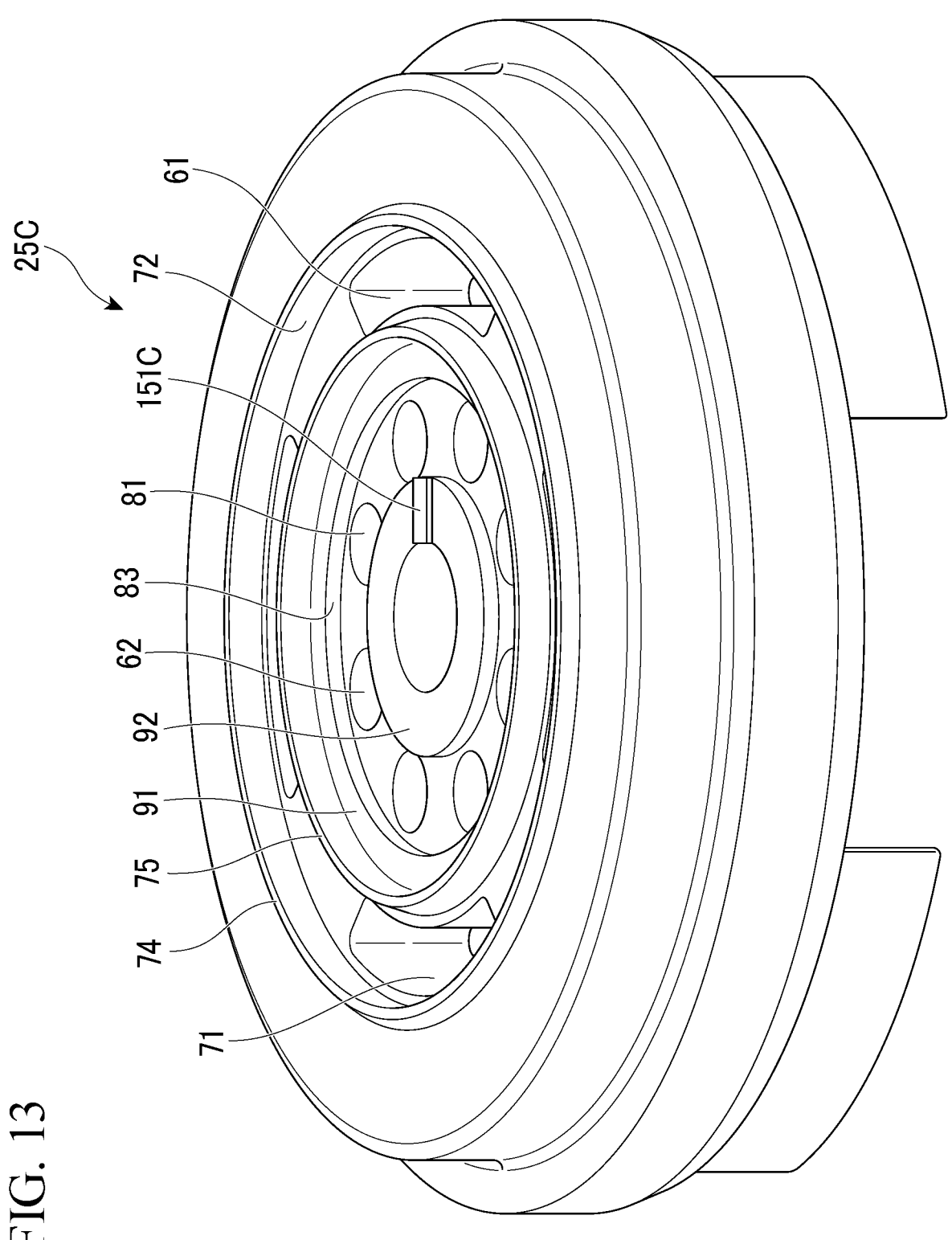
FIG. 13 is a perspective view showing a cage body of a shock absorber of a third embodiment according to the present invention.

In the third embodiment, a cage body 25C that is partially different from the cage body 25 is used as shown in FIG. 13 instead of the cage body 25. In the cage body 25C, a protruding part 151C protruding from a fixed seat part 92 to the lower chamber 49 side in an axial direction of the cage body 25 (see FIG. 2) is formed at a predetermined position of the fixed seat part 92.

Figure 14:
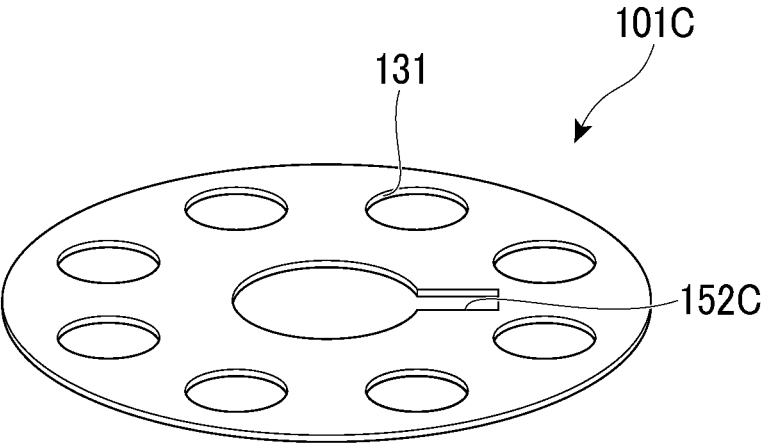
FIG. 14 is a perspective view showing a passage adjusting disc of the shock absorber of the third embodiment according to the present invention.

In the third embodiment, a passage adjusting disc 101C that is partially different from the passage adjusting disc 101 is used as shown in FIG. 14 instead of the passage adjusting disc 101. The passage adjusting disc 101C includes a notch part 152C formed in an inner circumferential portion. The notch part 152C penetrates the passage adjusting disc 101C in an axial direction of the passage adjusting disc 101C and opens inward in a radial direction of the passage adjusting disc 101C. The notch part 152C is disposed at a central position between adjacent through holes 131 in a circumference direction of the passage adjusting disc 101C. A protrusion height of the protruding part 151C shown in FIG. 13 from the fixed seat part 92 is set to be equal to or less than a thickness of the passage adjusting disc 101C shown in FIG. 14. The passage adjusting disc 101C, including the notch part 152C, is also formed by punching a plate material with a press.

Figure 15:
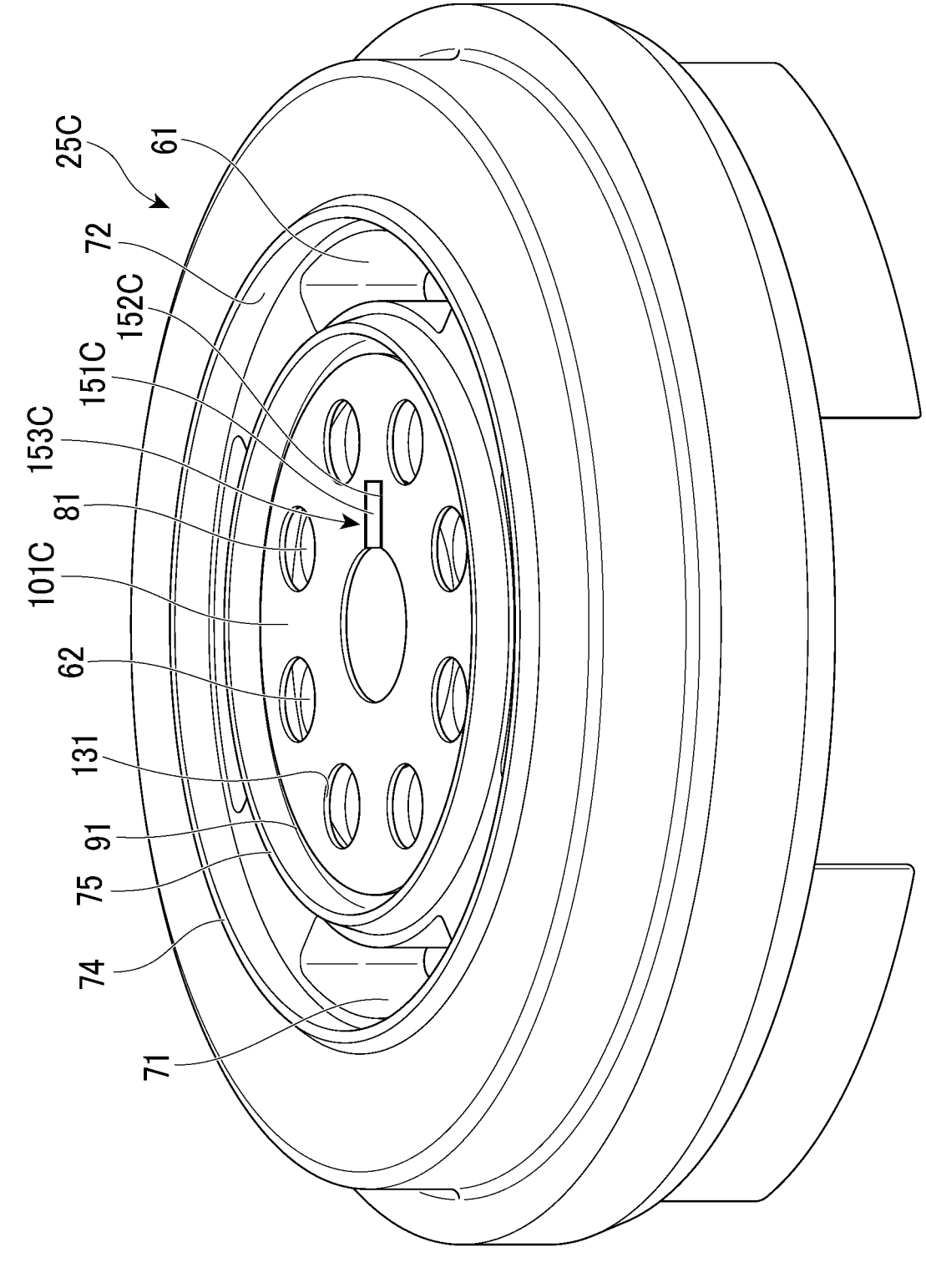
FIG. 15 is a perspective view showing a state in which the passage adjusting disc is placed on the cage body of the shock absorber of the third embodiment according to the present invention.

Then, when the passage adjusting disc 101C is placed on a land part 91 and the fixed seat part 92 of the cage body 25C shown in FIG. 13, the notch part 152C of the passage adjusting disc 101C is engaged with the protruding part 151C of the cage body 25C as shown in FIG. 15. Thereby, a positional relationship between the plurality of through holes 131 of the passage adjusting disc 101C and a plurality of second passage holes 81 of a second passage 62 in a circumferential direction of the cage body 25C can be made constant. The notch part 152C of the passage adjusting disc 101C and the protruding part 151C of the cage body 25C are provided in the cage body 25C and the passage adjusting disc 101C and are engaged with each other to constitute an engaging part 153C for positioning the passage adjusting disc 101C in the circumferential direction with respect to the cage body 25C.

Also in the third embodiment, in addition to the passage adjusting disc 101C, a plurality of passage adjusting discs including the notch part 152C and having a through hole that is different in at least one of the number and inner diameter from the through holes 131 are prepared to be used selectively.

In the third embodiment with the above configuration, the engaging part 153C is provided in the cage body 25C and the passage adjusting disc 101C to engage them with each other for positioning the passage adjusting disc 101C in the circumferential direction with respect to the cage body 25C. Therefore, a flow of an oil fluid L flowing from the plurality of through holes 131 of the passage adjusting disc 101C to the plurality of second passage holes 81 of the second passage 62 can be stabilized, and valve opening characteristics of the second valve 107 (see FIG. 2) during the compression stroke can be stabilized.

Here, in the third embodiment, the protruding part 151C can be formed in the cage body 25A of modified example 1 to be used instead of the cage body 25C.

Also, in the third embodiment, conversely, a protruding part protruding in the axial direction of the passage adjusting disc may be provided on an inner circumferential side of the passage adjusting disc, and a recessed part that is recessed in the axial direction of the cage body to be engaged with the protruding part may be provided on a fixed seat part of the cage body so that an engaging part is formed using the protruding part and the recessed part.

Fourth Embodiment

Next, a fourth embodiment will be described mainly on the basis of FIGS. 16 to 18, focusing on differences from the first embodiment. Further, parts common to those in the first embodiment will be denoted by the same terms and the same reference signs.

Similarly to the second and third embodiments, also in the fourth embodiment, valve opening characteristics of the second valve 107 (see FIG. 2) during a compression stroke are made more stable than in the first embodiment.

Figure 16:
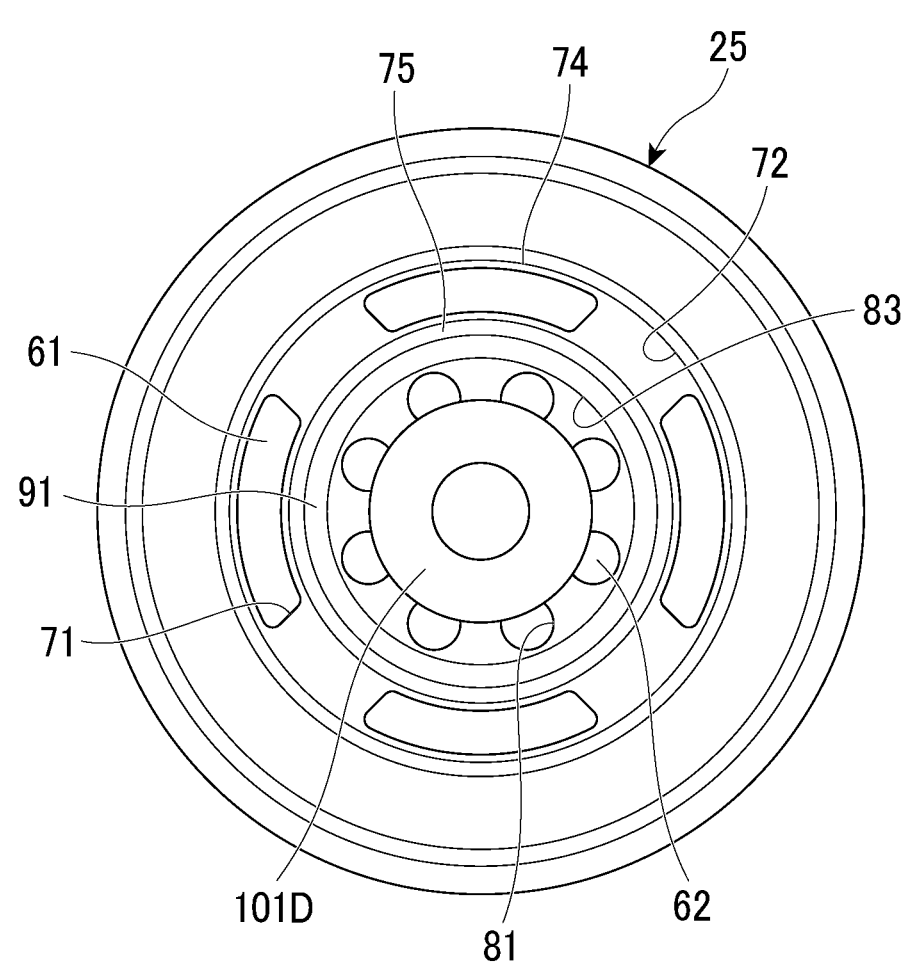
FIG. 16 is a plan view showing a state in which one passage adjusting disc is placed on a cage body of a shock absorber of a fourth embodiment according to the present invention.

In the fourth embodiment, a passage adjusting disc 101D that is partially different from the passage adjusting disc 101 is used as shown in FIG. 16 instead of the passage adjusting disc 101.

The passage adjusting disc 101D has an annular shape. The through hole 131 of the passage adjusting disc 101 is not formed in the passage adjusting disc 101D. The passage adjusting disc 101D has an inner diameter the same as an inner diameter of the passage adjusting disc 101, and an outer diameter smaller than an outer diameter of the passage adjusting disc 101. The passage adjusting disc 101D has an outer diameter larger than an inscribed circle of the plurality of a plurality of second passage holes 81 of a cage body 25 and smaller than a circumscribed circle of the plurality of second passage holes 81 of the cage body 25. Thereby, if the passage adjusting disc 101D is placed on a fixed seat part 92 of the cage body 25 (see FIG. 2), an outer circumferential portion thereof separates inward in a radial direction of the cage body 25 from a land part 91. That is, the passage adjusting disc 101D partially covers the second passage 62 in the radial direction of the cage body 25 to reduce the second passage 62. The passage adjusting disc 101D, is also formed by punching a plate material with a press.

In the fourth embodiment with the above configuration, since the passage adjusting disc 101D partially covers the second passage 62 in the radial direction of the cage body 25 to reduce the second passage 62, even if the passage adjusting disc 101D is not positioned in the circumferential direction with respect to the cage body 25, a flow of an oil fluid L flowing from a passage between the passage adjusting disc 101D and the land part 91 to the plurality of second passage holes 81 of the second passage 62 can be stabilized, and valve opening characteristics of the second valve 107 (see FIG. 2) during the compression stroke can be stabilized.

Figure 17:
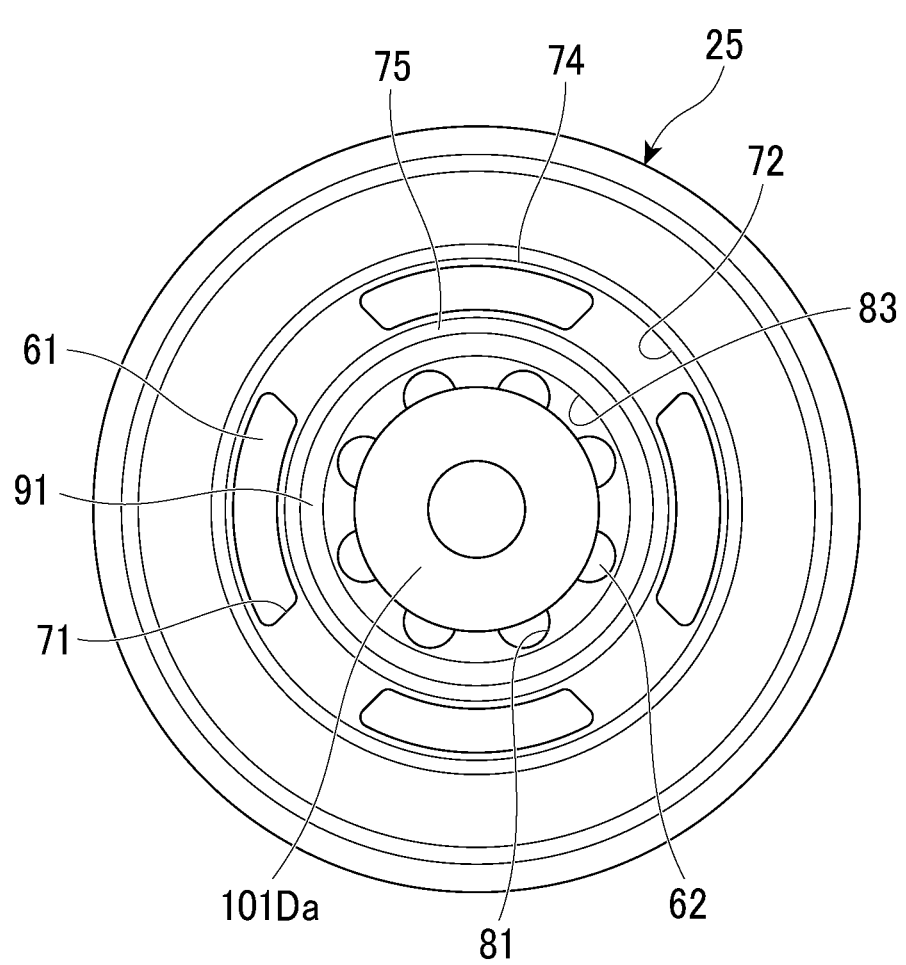
FIG. 17 is a plan view showing a state in which another passage adjusting disc is placed on the cage body of the shock absorber of the fourth embodiment according to the present invention.
Figure 18:
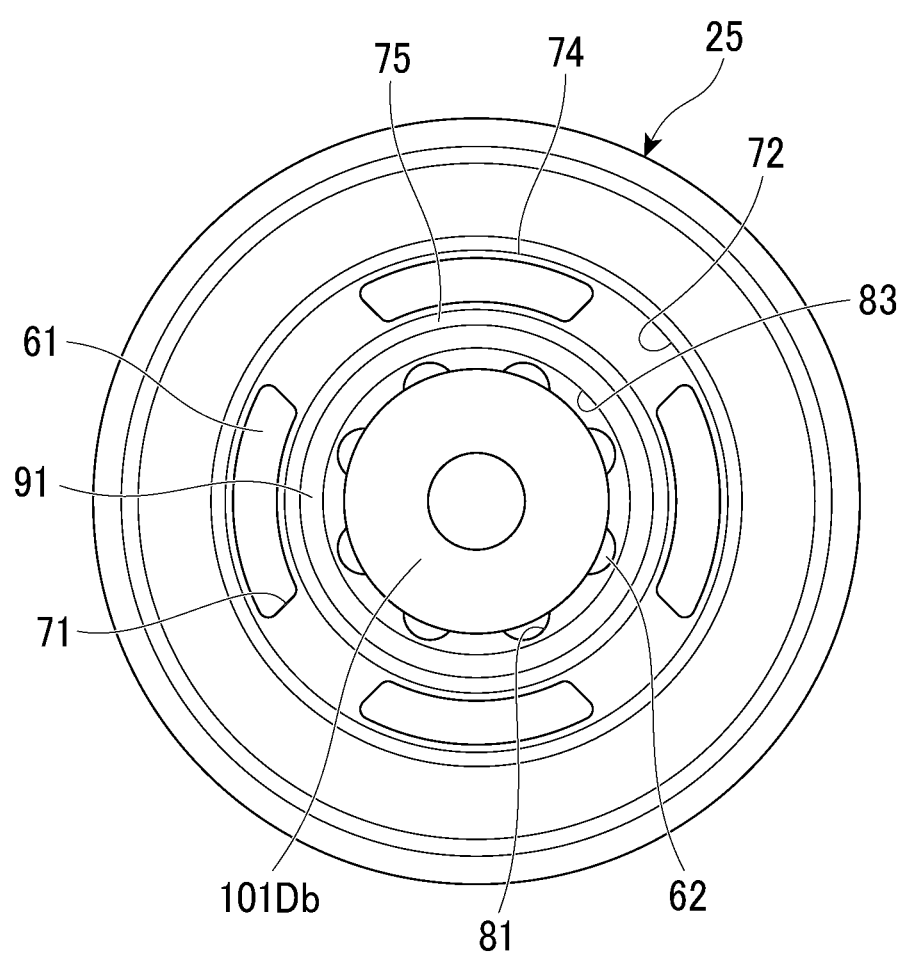
FIG. 18 is a plan view showing a state in which yet another passage adjusting disc is placed on the cage body of the shock absorber of the fourth embodiment according to the present invention.

In the fourth embodiment, in addition to the passage adjusting disc 101D, a plurality of types of passage adjusting discs having different outer diameters are prepared such as preparing a passage adjusting disc 101Da shown in FIG. 17 having an outer diameter larger than that of the passage adjusting disc 101D, and preparing a passage adjusting disc 101Db shown in FIG. 18 having an outer diameter larger than that of the passage adjusting disc 101Da, and thereby a passage adjusting disc according to required valve opening characteristics of the second valve 107 (see FIG. 2) is used. The passage adjusting discs 101Da and 101Db are also formed by punching a plate material with a press.

Here, in the fourth embodiment, it is also possible to use the cage body 25A of modified example 1 instead of the cage body 25.

Fifth Embodiment

Next, a fifth embodiment will be described mainly on the basis of FIGS. 19 to 21, focusing on differences from the first embodiment. Further, parts common to those in the first embodiment will be denoted by the same terms and the same reference signs.

Similarly to the second to fourth embodiments, also in the fifth embodiment, valve opening characteristics of the second valve 107 (see FIG. 2) during a compression stroke are made more stable than in the first embodiment.

Figure 19:
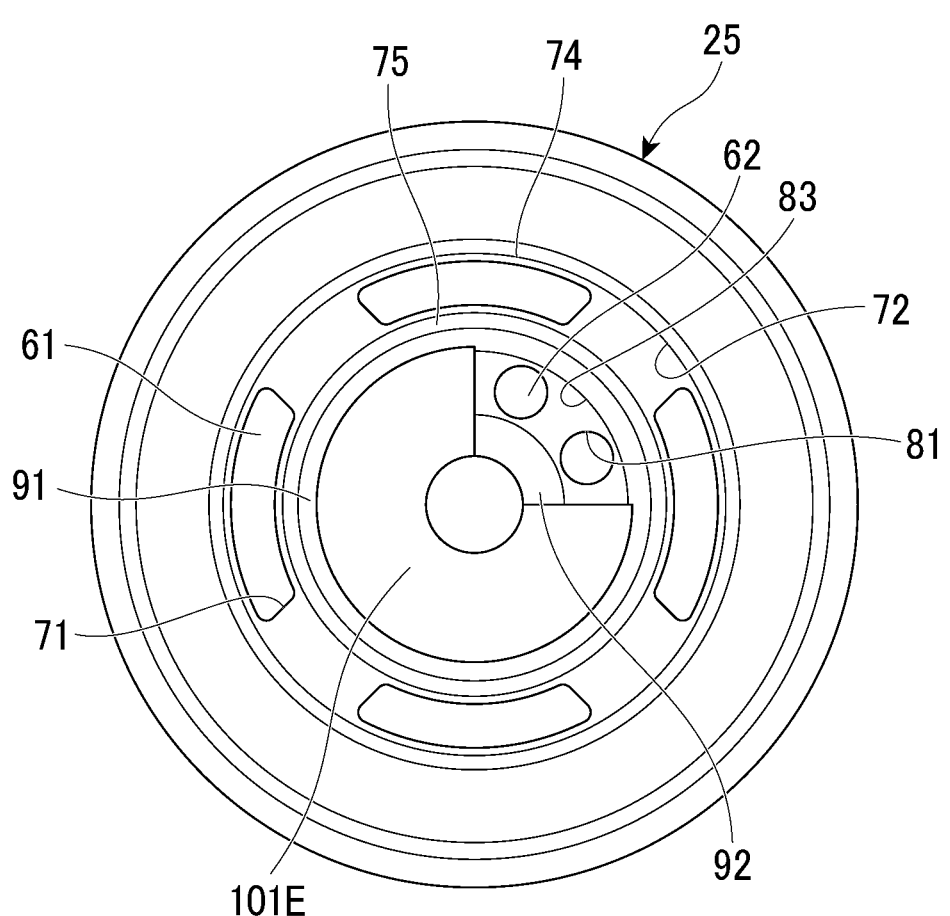
FIG. 19 is a plan view showing a state in which one passage adjusting disc is placed on a cage body of a shock absorber of a fifth embodiment according to the present invention.

In the fifth embodiment, a passage adjusting disc 101E that is partially different from the passage adjusting disc 101 as shown in FIG. 19 is used instead of the passage adjusting disc 101.

The passage adjusting disc 101E has an annular shape with a part missing. In other words, the passage adjusting disc 101E is not circular but has an arcuate shape. The through hole 131 of the passage adjusting disc 101 is not formed in the passage adjusting disc 101E. The passage adjusting disc 101E has an inner diameter the same as an inner diameter of the passage adjusting disc 101, and an outer diameter the same as an outer diameter of the passage adjusting disc 101. Thereby, if the passage adjusting disc 101E is placed on a land part 91 of a cage body 25 and a fixed seat part 92 as shown in FIG. 19, the passage adjusting disc 101E partially covers a second passage 62 in a circumferential direction of the cage body 25 to reduce the second passage 62. The passage adjusting disc 101E is also formed by punching a plate material with a press.

In the fifth embodiment with the above configuration, since the passage adjusting disc 101E partially covers the second passage 62 in the circumferential direction of the cage body 25 to reduce the second passage 62, even if the passage adjusting disc 101E is not positioned in the circumferential direction with respect to the cage body 25, a flow of an oil fluid L flowing from a passage between the passage adjusting disc 101E, the land part 91, and the fixed seat part 92 to a plurality of second passage holes 81 of the second passage 62 can be stabilized, and valve opening characteristics of the second valve 107 (see FIG. 2) during the compression stroke can be stabilized.

Figure 20:
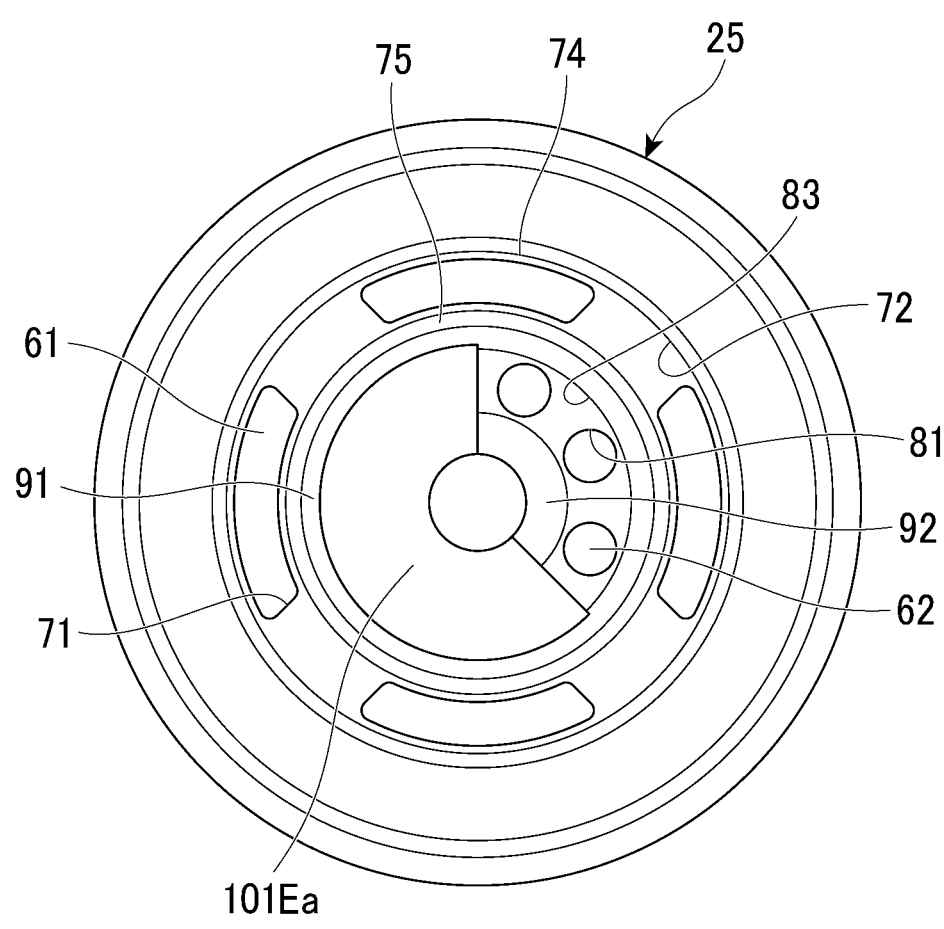
FIG. 20 is a plan view showing a state in which another passage adjusting disc is placed on the cage body of the shock absorber of the fifth embodiment according to the present invention.
Figure 21:
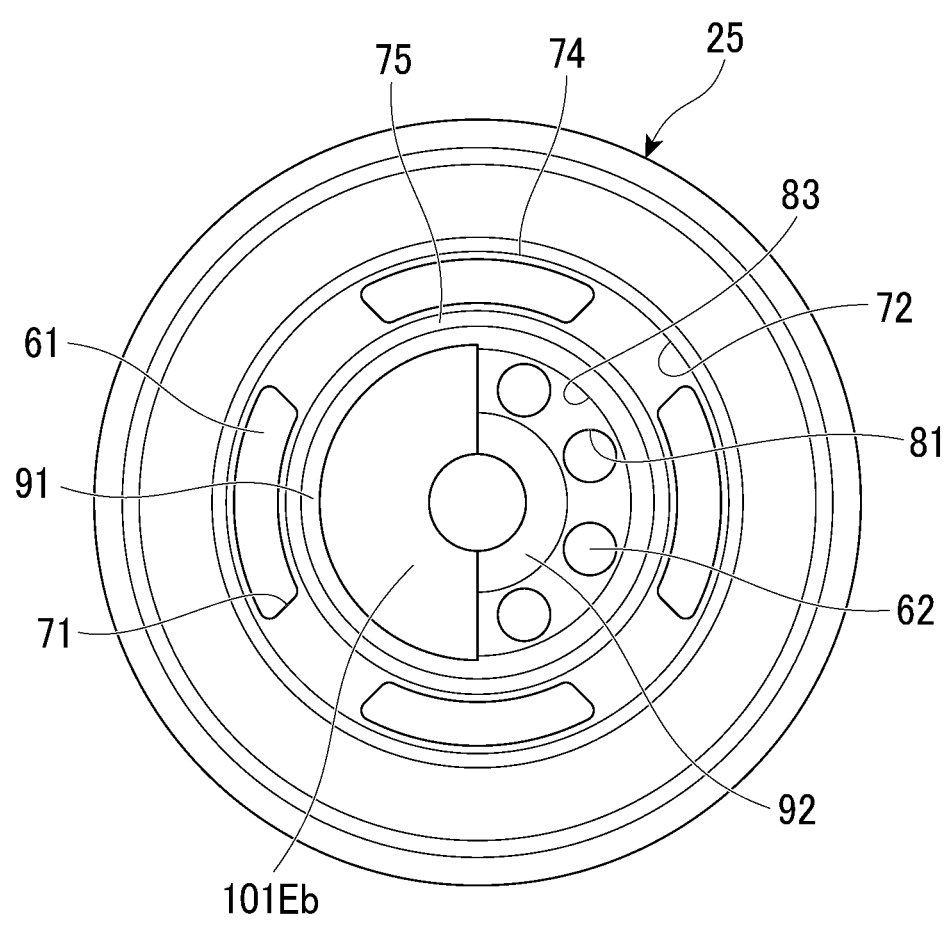
FIG. 21 is a plan view showing a state in which yet another passage adjusting disc is placed on the cage body of the shock absorber of the fifth embodiment according to the present invention.

In the fifth embodiment, in addition to the passage adjusting disc 101E, a plurality of types of passage adjusting discs having different circumferential lengths are prepared such as preparing a passage adjusting disc 101Ea shown in FIG. 20 having a circumferential length smaller than that of the passage adjusting disc 101E, or preparing a passage adjusting disc 101Eb shown in FIG. 21 having a circumferential length smaller than that of the passage adjusting disc 101Ea, and thereby a passage adjusting disc according to required valve opening characteristics of the second valve 107 (see FIG. 2) is used. The passage adjusting discs 101Ea and 101Eb are also formed by punching a plate material with a press.

Here, in the fifth embodiment, it is also possible to use the cage body 25A of modified example 1 instead of the cage body 25.

Sixth Embodiment

Next, a sixth embodiment will be described mainly on the basis of FIG. 22. Further, parts common to those in the first to fifth embodiments will be denoted by the same terms and the same reference signs.

Figure 22:
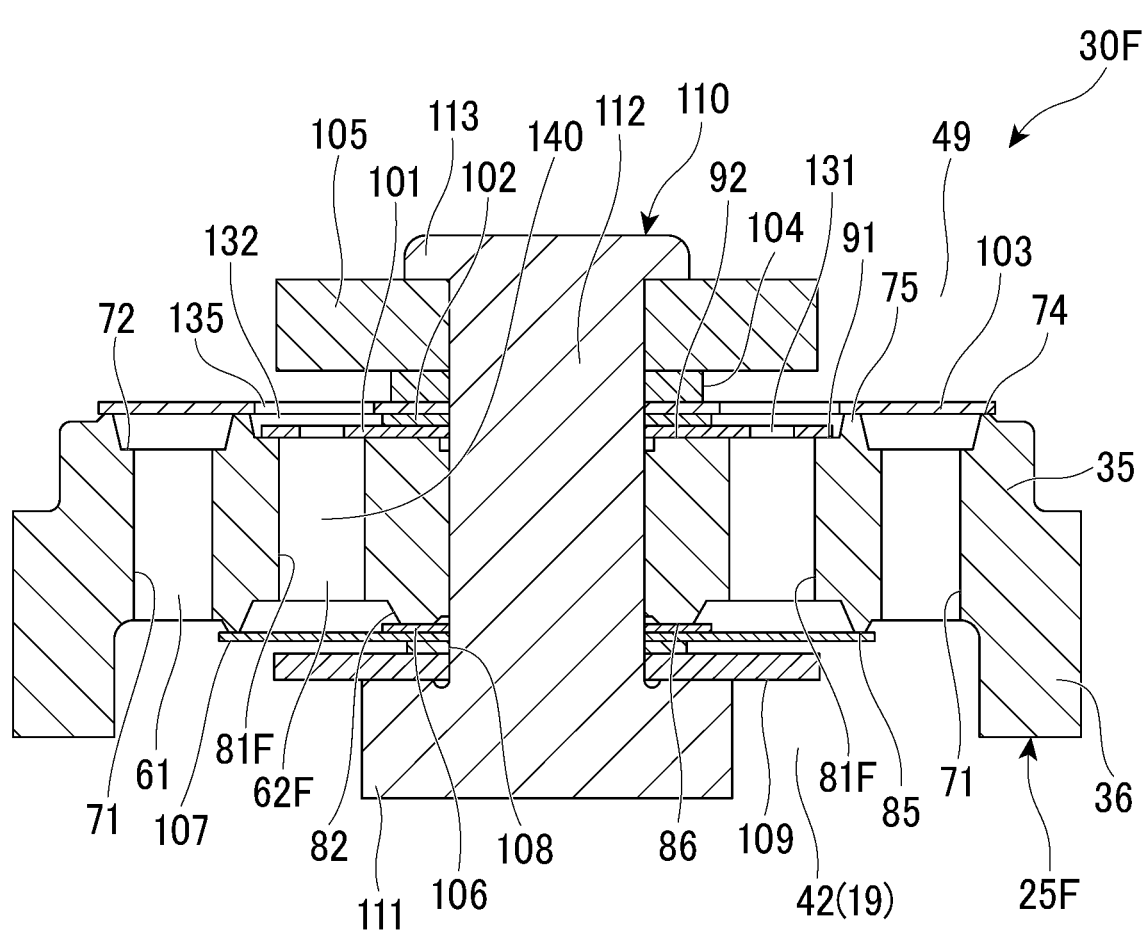
FIG. 22 is a cross-sectional view showing a body valve assembly of a shock absorber of a sixth embodiment according to the present invention.

In the sixth embodiment, as shown in FIG. 22, the body valve assembly 30F uses a cage body 25F in which the third annular groove 83 is not formed and a plurality of second passage holes 81F which are longer than the plurality of second passage holes 81 in the axial direction by a length corresponding to the third annular groove 83 constitute a second passage 62F. That is, when the cage body 25F in which such a third annular groove 83 is not provided and the second passage holes 81F directly communicate with passages in through holes 131 is used, if the engaging part 153 of the second embodiment is employed, the engaging part 153C of the third embodiment is employed, the passage adjusting disc 101D of the fourth embodiment is employed, or the passage adjusting disc 101E of the fifth embodiment is employed, effects of stabilizing valve opening characteristics of the second valve 107 during a compression stroke are high.

Further, in the embodiments, a hydraulic shock absorber has been shown as an example of the shock absorber 11, but the above-described structure can also be employed for a shock absorber using water or air as a working fluid.

EXPLANATION OF REFERENCES

11 Shock absorber
17 Cylinder
18 Inner chamber
25, 25A to 25C Cage body
42 Bottom chamber (second chamber)
49 Lower chamber (first chamber)
61 First passage
62 Second chamber
74 Outer seat part (first seat part)
75 Inner seat part (first seat part)

85 Seat part (second seat part)
101, 101B, 101C, 101Da, 101Db, 101E, 101Ea, 101Eb Passage adjusting disc
103 First valve
107 Second valve
131 Through hole
135 Communication hole
153, 153C Engaging part

What is claimed is:

1. A shock absorber comprising:
a cylinder having an inner chamber;
a cage body partitioning the inner chamber into a first chamber and a second chamber, the cage body including a first passage allowing communication between the first chamber and the second chamber, a first seat part provided to surround an end portion of the first passage on the first chamber side, a second passage allowing communication between the first chamber and the second chamber, and a second seat part provided to surround an end portion of the second passage on the second chamber side;
a first valve configured to come into contact with the first seat part to close the first passage and being separated from the first seat part to open the first passage, and in which a communication hole communicating with the second passage is formed;
a second valve configured to come into contact with the second seat part to close the second passage and being separated from the second seat part to open the second passage; and
a passage adjusting disc provided between the first valve and the cage body to reduce the second passage, wherein
the passage adjusting disc has an annular shape,
the passage adjusting disc has a through hole penetrating in an axial direction between an inner circumferential portion and an outer circumferential portion thereof, and
an engaging part is provided in the cage body and the passage adjusting disc to engage them with each other for positioning the passage adjusting disc in a circumferential direction with respect to the cage body.

2. The shock absorber according to claim 1, wherein the passage adjusting disc has an annular shape and partially covers the second passage in a radial direction of the cage body.

3. The shock absorber according to claim 1, wherein the passage adjusting disc has an annular shape with a part missing and partially covers the second passage in a circumferential direction of the cage body.

* * * * *